US009543597B2

United States Patent
Arai et al.

(10) Patent No.: US 9,543,597 B2
(45) Date of Patent: Jan. 10, 2017

(54) FUEL-CELL POWER GENERATION SYSTEM AND METHOD OF MANUFACTURING THE SAME

(71) Applicants: KABUSHIKI KAISHA TOSHIBA, Minato-ku (JP); Toshiba Fuel Cell Power Systems Corporation, Yokohama-shi (JP)

(72) Inventors: Yasuhiro Arai, Yokohama (JP); Takayuki Shinohara, Yokohama (JP); Jun Udagawa, Yokohama (JP); Kenzo Tonoki, Tokyo (JP); Norihito Togashi, Yokohama (JP)

(73) Assignees: KABUSHIKI KAISHA TOSHIBA, Minato-ku (JP); Toshiba Fuel Cell Power Systems Corporation, Yokohama-shi (JP)

( * ) Notice: Subject to any disclaimer, the term of this patent is extended or adjusted under 35 U.S.C. 154(b) by 0 days.

(21) Appl. No.: 13/758,551

(22) Filed: Feb. 4, 2013

(65) Prior Publication Data
US 2013/0149629 A1    Jun. 13, 2013

Related U.S. Application Data

(63) Continuation of application No. PCT/JP2011/067513, filed on Jul. 29, 2011.

(30) Foreign Application Priority Data

Aug. 4, 2010   (JP) .................. 2010-175640
Dec. 22, 2010  (JP) .................. 2010-286349
Jul. 22, 2011  (JP) .................. 2011-160796

(51) Int. Cl.
*H01M 8/04*    (2016.01)
*H01M 8/02*    (2016.01)

(52) U.S. Cl.
CPC ............ *H01M 8/04* (2013.01); *H01M 8/0286* (2013.01); *H01M 8/04201* (2013.01); *Y02E 60/50* (2013.01); *Y02P 70/56* (2015.11)

(58) Field of Classification Search
None
See application file for complete search history.

(56) References Cited

U.S. PATENT DOCUMENTS 4,981,239 A * 1/1991 Cappel .................. B65D 47/40
                                                      222/109
5,063,123 A * 11/1991 Ohsuga et al. ............... 429/456
(Continued)

FOREIGN PATENT DOCUMENTS

EP    1 528 330 A1   5/2005
JP    1-195672       8/1989
(Continued)

OTHER PUBLICATIONS

International Preliminary Report on Patentability Issued Mar. 21, 2013 in PCT/JP2011/067513.
(Continued)

*Primary Examiner* — Cynthia H Kelly
*Assistant Examiner* — Christopher Domone
(74) *Attorney, Agent, or Firm* — Oblon, McClelland, Maier & Neustadt, L.L.P.

(57) ABSTRACT

According to one embodiment, a fuel-cell power generation system includes a fuel cell that generates electricity by electrochemical reaction using fuel and an oxidizer and a resin module that includes a flow path through which fuel, air, or water flows, inner walls defining the flow path being made of resin.

9 Claims, 15 Drawing Sheets

(56) References Cited

U.S. PATENT DOCUMENTS

| | | | |
|---|---|---|---|
| 6,889,719 B2 | 5/2005 | Watanabe et al. | |
| 7,399,328 B2 | 7/2008 | Ukai et al. | |
| 7,527,889 B2* | 5/2009 | Komura et al. | 429/457 |
| 8,192,887 B2* | 6/2012 | Ozaki et al. | 429/458 |
| 2005/0048348 A1* | 3/2005 | Bazzarella | 429/34 |
| 2007/0072026 A1* | 3/2007 | Andrin | 429/26 |
| 2007/0196716 A1 | 8/2007 | Mashimo et al. | |
| 2009/0029207 A1 | 1/2009 | Lee et al. | |
| 2011/0274967 A1* | 11/2011 | Suzuki | H01M 2/0434 429/185 |

FOREIGN PATENT DOCUMENTS

| | | | |
|---|---|---|---|
| JP | H06-231791 | * | 8/1994 |
| JP | 9-63307 | | 3/1997 |
| JP | H09-063307 | * | 3/1997 |
| JP | 2000-163134 | | 6/2000 |
| JP | 2002-305010 A | | 10/2002 |
| JP | 2003-21275 | | 1/2003 |
| JP | 2004-156755 | | 6/2004 |
| JP | 2004-178916 | | 6/2004 |
| JP | 2004-190713 | * | 7/2004 |
| JP | 2004-211531 | | 7/2004 |
| JP | 2004-316663 | | 11/2004 |
| JP | 2005-43060 | | 2/2005 |
| JP | 2005-91326 | | 4/2005 |
| JP | 2005-158713 | | 6/2005 |
| JP | 2006-016759 | * | 1/2006 |
| JP | 2006-16759 | | 1/2006 |
| JP | 2006-069179 | * | 3/2006 |
| JP | 2006-69179 A | | 3/2006 |
| JP | 2006-242247 A | | 9/2006 |
| JP | 2006-284320 | | 10/2006 |
| JP | 2007-283677 | | 11/2007 |
| JP | 2008-277039 | | 11/2008 |
| JP | 2009-030703 | * | 2/2009 |
| JP | 2009-30703 | | 2/2009 |
| JP | 2009-52640 | | 3/2009 |
| JP | 2009-203095 | | 9/2009 |

OTHER PUBLICATIONS

Written Opinion of the International Searching Authority Issued Nov. 1, 2011 in PCT/JP2011/067513 (English translation only).
International Search Report issued on Nov. 1, 2011 for PCT/JP2011/067513 filed on Jul. 29, 2011 with English translation.
International Written Opinion issued on Nov. 1, 2011 for PCT/JP2011/067513 filed on Jul. 29, 2011.
Office Action issued on Sep. 24, 2014 in the corresponding Japanese patent Application No. 2011-160796 (with English Translation).
Office Action issued May 22, 2014 in Korean Patent Application No. 10-2012-7032335 (with English Translation).
Office Action issued Apr. 7, 2015 in Japanese Patent Application No. 2011-160796 (with English language translation).
Office Action issued Mar. 1, 2016, in European Patent Application No. 11814587.9 (English-language).
Extended European Search Report issued Jun. 20, 2016 in Patent Application No. 11814587.9.

* cited by examiner

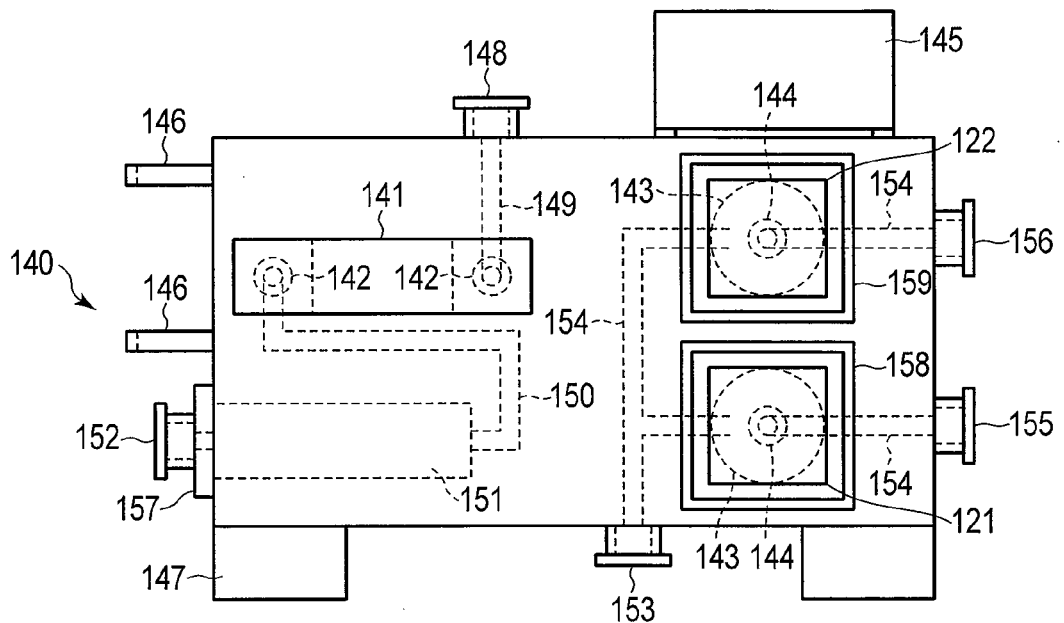
F I G. 7
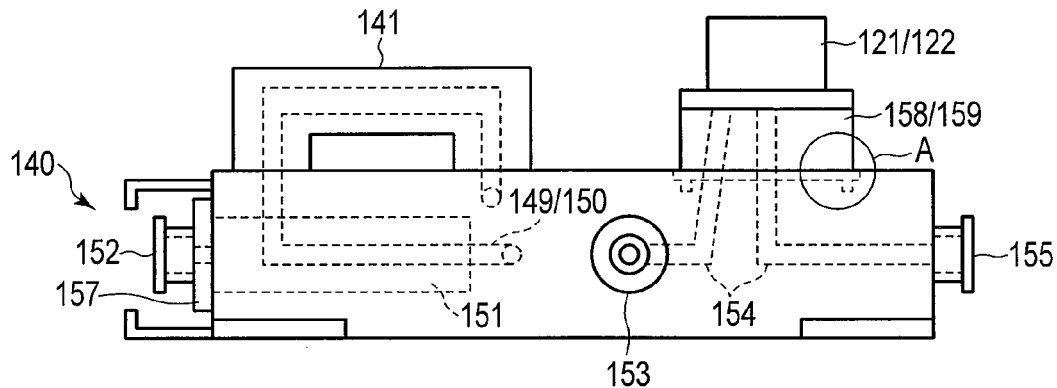
F I G. 8
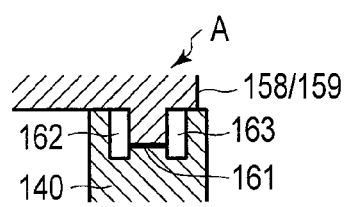
F I G. 9

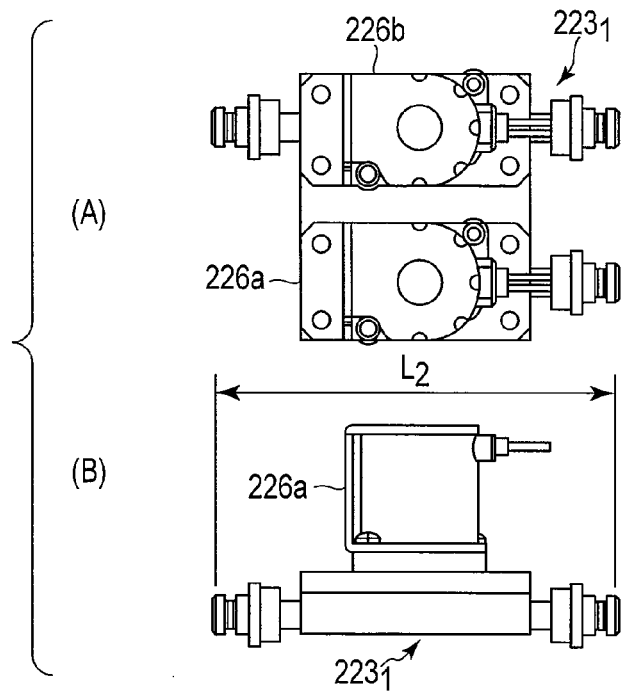
F I G. 11
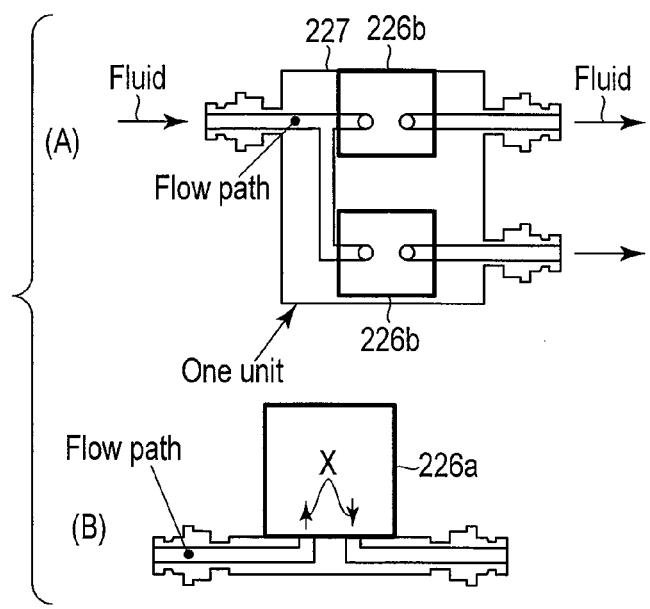
F I G. 12

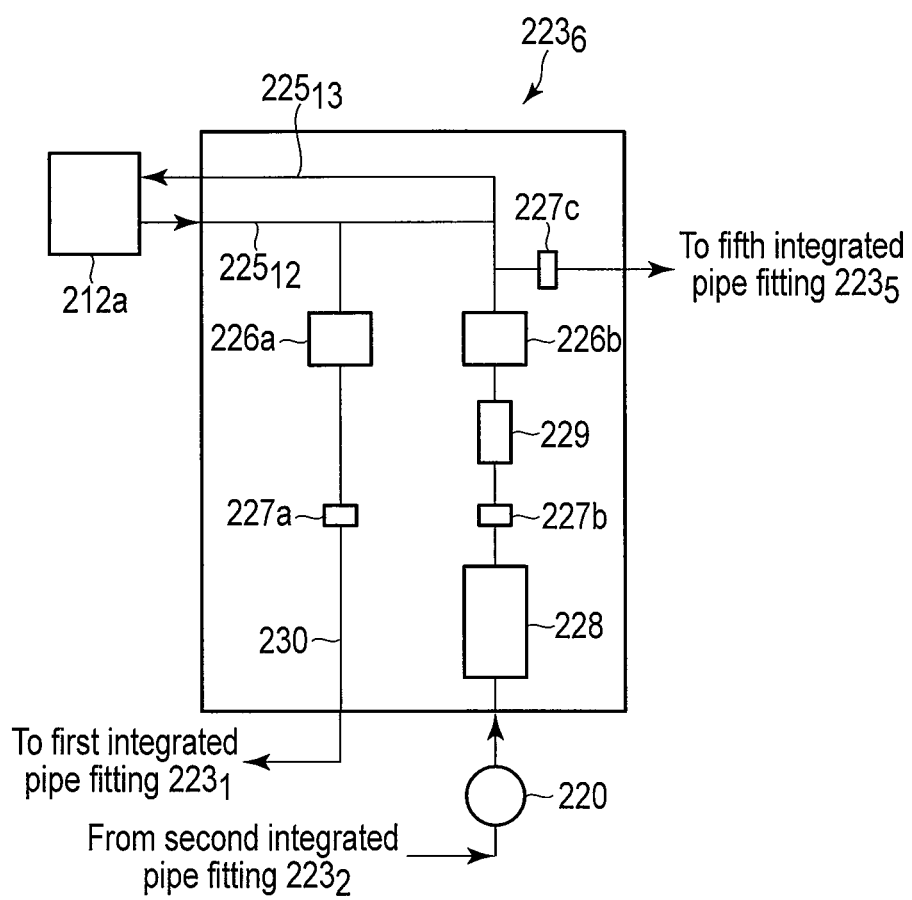
F I G. 13

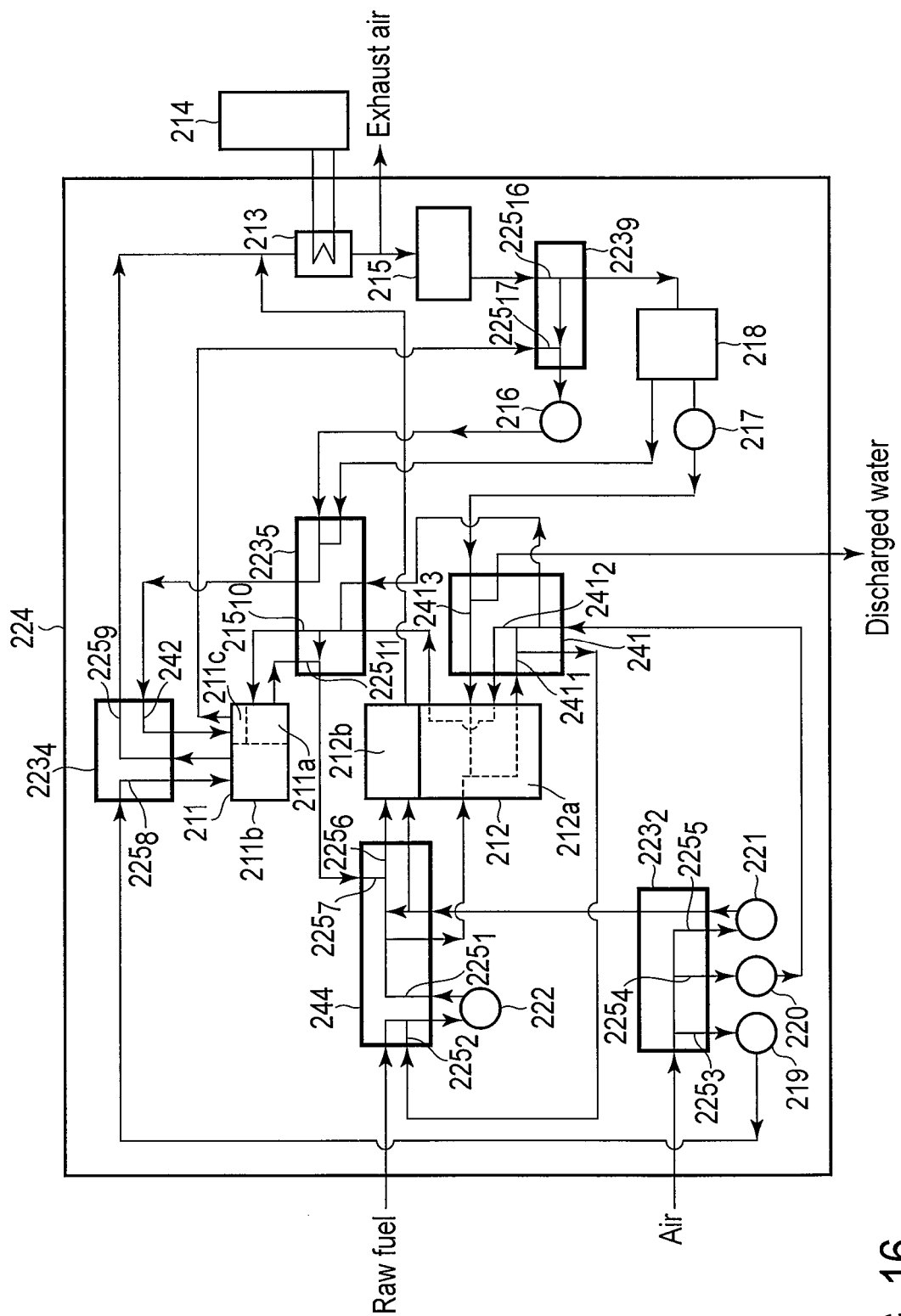
F I G. 16

FUEL-CELL POWER GENERATION SYSTEM AND METHOD OF MANUFACTURING THE SAME

CROSS-REFERENCE TO RELATED APPLICATIONS

This application is a Continuation Application of PCT Application No. PCT/JP2011/067513, filed Jul. 29, 2011 and based upon and claiming the benefit of priority from Japanese Patent Applications No. 2010-175640, filed Aug. 4, 2010; No. 2010-286349, filed Dec. 22, 2010; and No. 2011-160796, filed Jul. 22, 2011, the entire contents of all of which are incorporated herein by reference.

FIELD

Embodiments described herein relate generally to a fuel-cell power generation system and a method of manufacturing the same.

BACKGROUND

A polymer electrolyte fuel cell (PEFC) is known as one kind of the fuel cell. A fuel cell of the polymer electrolyte fuel cell includes an anode acting as a fuel electrode and a cathode acting as an oxidizer electrode, and a solid polymer electrolyte membrane sandwiched between the anode and cathode. The polymer electrolyte fuel cell is so configured that a plurality of elements each composed of a fuel cell sandwiched between separators are stacked one on top of another.

In the case of an in-car polymer electrolyte fuel cell, maneuverability is regarded as important and therefore there are many systems that use pure hydrogen as fuel and air as an oxidizer.

However, in the case of a stationary or a household polymer electrolyte fuel cell, a system that uses town gas or propane gas full of methane components as fuel has been desired from the standpoint of an infrastructure problem. In this case, it is common practice to use a fuel processor that produces hydrogen by mixing water vapor with fuel to reform fuel into hydrogen.

In any system, hydrogen supplied to the anode side is ionized, flows in a solid polymer electrolyte membrane, and reacts with oxygen on the cathode side to produce water and generate electric energy outside.

The polymer electrolyte fuel cell generates not only electric energy but also exhaust heat of not higher than 100° C. This is because the heat dissipation from the high cell temperature toward the ambient temperature takes place in the form of heat. In the fuel processor for reforming fuel into hydrogen, too, a combustor is generally used for heating in reforming reaction in a reformer or the like, with the result that exhaust heat is generated by combustion exhaust gas or comes from outside the fuel processor.

Use of heat generated when such a fuel cell generates electricity enables hybrid operation with electric energy, that is, cogeneration operation, which makes it possible to realize a very economical, energy-efficient, environmentally friendly operation.

In recent years, developments have been made to introduce such a fuel-cell power generation system into homes. In Japan, the practical use of such a fuel-cell power generation system is already in progress. The fuel-cell power generation system emits a smaller amount of carbon dioxide and is superior in environmental preservation and energy saving. Therefore, attention is being focused on the fuel-cell power generation system as an energy system capable of preventing global warming.

The fuel-cell power generation system can be installed in more places as it is smaller in size and requires a smaller installation area, resulting in an expansion of the market size and the popularization of energy-saving devices. In addition, as the system becomes smaller and lighter in weight, it is easier to move the system for installation, improving its merchantability.

Accordingly, to promote the popularization of the fuel-cell power generation system, not only an improvement in the basic performance of the system, including power generation efficiency and exhaust heat efficiency, but also a highly manufacturable configuration capable of size reduction are desired.

BRIEF DESCRIPTION OF THE DRAWINGS

FIG. 7 is a plan view of the resin block module of FIG. 6;

FIG. 8 is a front view of the resin block module of FIG. 6;

FIG. 9 is an enlarged view of a part enclosed by a circle in FIG. 8;

FIG. 11 is a diagram to explain an integrated pipe fitting used in the fuel-cell power generation system of FIG. 9;

FIG. 12 is a diagram to explain flow paths in the integrated pipe fitting of FIG. 11;

FIG. 13 is an explanatory diagram showing a concrete configuration of a sixth integrated pipe fitting used in the fuel-cell power generation system of FIG. 10;

FIG. 16 is a block diagram of a fuel-cell power generation system according to a sixth embodiment;

DETAILED DESCRIPTION

Embodiments will be described with reference to the drawings.

In general, according to one embodiment, there is provided a fuel-cell power generation system. The fuel-cell power generation system includes a fuel cell that generates electricity by electrochemical reaction using fuel and an oxidizer and a resin module that includes flow paths through which fuel, air, or water flows, inner walls defining the flow paths being made of resin.

First Embodiment

Figure 1:
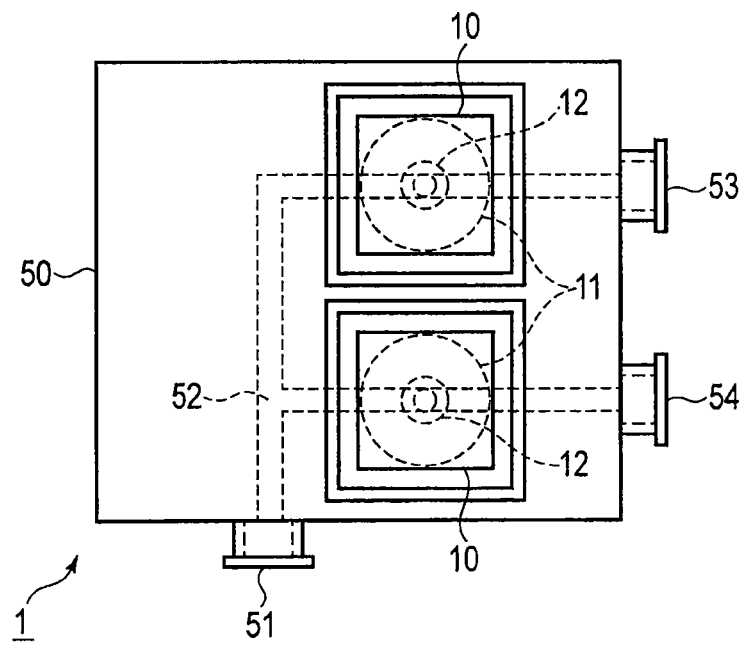
FIG. 1 is a plan view showing a configuration of a device mounting unit of a fuel-cell power generation system according to a first embodiment.

FIG. 1 is a plan view showing a configuration of a device mounting unit of a fuel-cell power generation system according to a first embodiment.

The fuel-cell power generation system 1 of the first embodiment is applied to, for example, household fuel-cell power generation system. Hereinafter, although an explanation will be given, taking a household fuel-cell power generation system as an example, the fuel-cell power generation system 1 of the first embodiment may be applied to one other than the household fuel-cell power generation system.

As shown in FIG. 1, the fuel-cell power generation system 1 of the first embodiment comprises a resin block module (also simply referred to as a resin module) 50 in which a plurality of flow paths (for example, pipes) through which fluid (fuel, air, or water) flows are formed integrally with resin.

In the resin block module 50, various devices are arranged via sealing members, such as O-rings. As the devices, for example, a plurality of cutoff valves 10 are mounted. Each flow path is sealed with, for example, a cutoff valve O-ring (large) 11 and a cutoff valve O-ring (small) 12.

Fluid is supplied from a hookup 51 to the resin block module 50 via a blower (not shown). Fuel branches at a resin pipe part 52 and then enters the cutoff valve 10. The flow of the fuel is determined by the opening-closing control of each cutoff valve. Fuel is to be directed from a hookup 53 or hookup 54 to a connection pipe (not shown) outside the resin block module 50 as needed.

Figure 2:
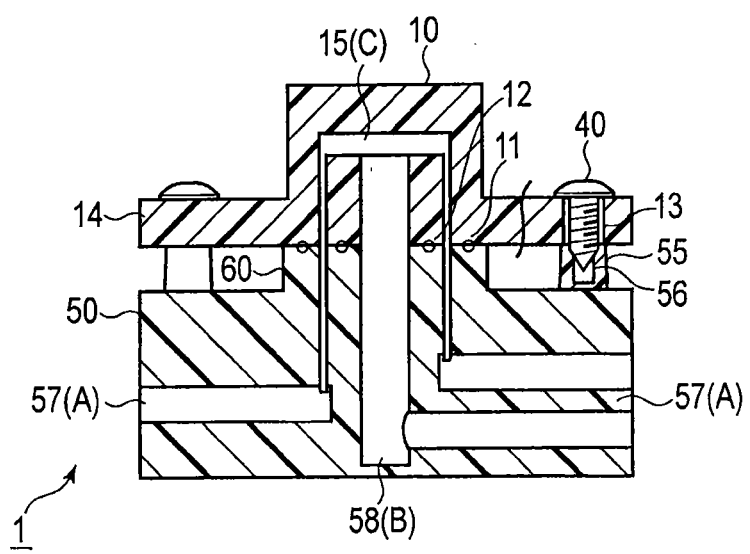
FIG. 2 is a sectional view of a configuration of a device installation part and its periphery, including a cutoff valve and a resin block module shown in FIG. 1.

FIG. 2 is a sectional view showing a configuration of a device installation part and its periphery, including the cutoff valve 10 and resin block module 50 shown in FIG. 1. Elements common to those of FIG. 1 are indicated by the same reference numbers.

The resin block module 50 integrally formed with resin includes a passage part boss (a first convex structure part) 60 and a plurality of bosses (a plurality of second convex structure parts) 55. The cutoff valve 10 is mounted to the resin block module 50 via the passage part boss 60 and the bosses 55. On a contact face between the distribution part boss 60 and cutoff valve 10, the cutoff-valve O-ring (large) 11 and cutoff-valve O-ring (small) 12 are arranged. In each of the areas divided by the O-rings, separate fuel passage holes are made, respectively.

Not only is a large-diameter hole 13 made in a cutoff-valve base plate 14 on the cutoff valve 10 side, but also a lower hole 56 is made in a boss 55 on the resin block module 50 side and a fixing screw 40 is screwed into the lower hole 56 through the large-diameter hole 13, thereby fixing the cutoff valve 10 to the resin block module 50.

The cutoff-valve base plate 14 and resin block module 50 are made of the same material. For example, PPS (polyphenylene sulfide) is used as material.

As the fixing screw 40, a tapping screw that requires no insert member (for example, metal insert) is used. In this case, a screw called, for example, a nonsert (a registered trademark) may be used. The angle of each thread of the fixing screw 40 is set in the range of 20 to 35°, preferably in the range of 25 to 30°. This enables the screw to cut in the resin sharply with a suitable torque without the occurrence of a crack in the resin, thereby fixing the cutoff valve 10 to the resin block module 50 reliably.

When the fixing screw is a M3 screw, for example, a 3.2-mm-diameter through-hole is made as the large-diameter hole 13 and, for example, a 2.5-mm-diameter hole is made as the lower hole 56. As a result, the fixing screw 40 itself cuts a thread in the resin of the lower hole 56 suitably, thereby fixing the cutoff valve 10 to the resin block module 50.

After the cutoff valve 10 has been fixed to the resin block module 50 in this way, flow path 57(A) and flow path 58(B) on the resin block module 50 side are connected to flow path 15(C) on the cutoff valve 10 side, forming a circuit A-C-B. In addition, the flow is controlled by a mechanism (not shown) in the cutoff valve 10.

Figure 3:
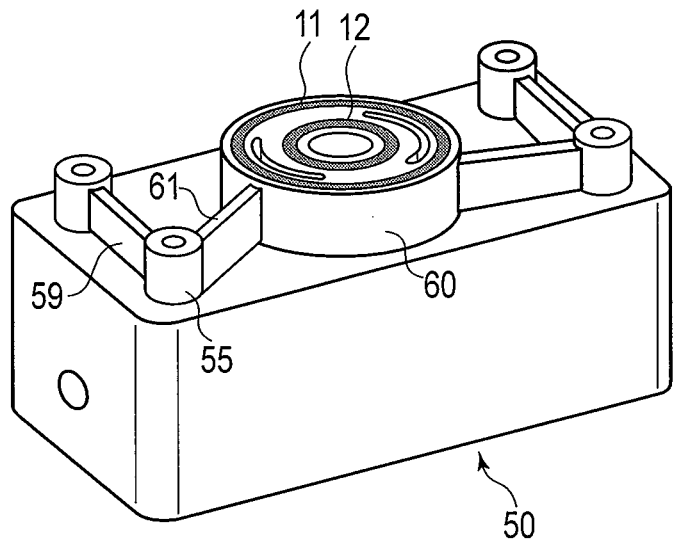
FIG. 3 is a perspective view showing a structure of the device installation part and its periphery on the resin block module side.

FIG. 3 is a perspective view showing a structure of the device installation part and its periphery on the resin block module 50 side.

The resin block module 50 integrally formed with resin may be configured to further include a reinforcing plate (rib) 59 or a reinforcing plate (rib) 61 that couples at least two of the passage part boss (the first convex structure part) 60 and the bosses (the second convex structure parts) 55. In the example of FIG. 3, the reinforcing plate 59 couples adjacent bosses 55 with each other and the reinforcing plate 61 couples the passage part boss 60 and boss 55 with each other. With this configuration, a warp, a distortion, and a bend in the contact face between the cutoff valve 10 and the resin block module 50 are suppressed, preventing members from being damaged or broken. In addition, the installation of the cutoff valve 10 is stable, preventing the displacement of flow path joining parts or the leakage of fluid.

According to the first embodiment, it is possible to provide a fuel-cell power generation system which increases the manufacturability and realizes size reduction and a method of manufacturing the fuel-cell power generation system.

For example, when the cutoff valve 10 is fixed, the O-ring (large) and O-ring (small) are pressed against each other by the fastening power of screws, securing the sealing performance and forming the A-C-B circuit. At the same time, an A-C circuit and a C-B circuit are prevented from connecting with each other at the contact face between the cutoff valve 10 and the resin block module 50.

The temperature of fluid flowing in a flow path changes according to the operating condition of the fuel-cell power generation system. In this case, if the material of the periphery of the screw fixing part on the device side differs from that on the resin block module 50 side, a relative slide will take place due to a difference in linear expansion coefficient, which might lead to a cause of looseness in the long run. In contrast, use of the same material as described above prevents a relative slide from taking place and looseness from occurring with age due to temperature changes.

In addition, if a load is imposed on a boss due to temperature changes, the stress generated around the root part might become greater. Use of a reinforcing plate as described above prevents the boss from being damaged or broken. Furthermore, the flow of resin at the time of molding is improved, preventing the resin strength from decreasing because of poor molding.

Figure 4:
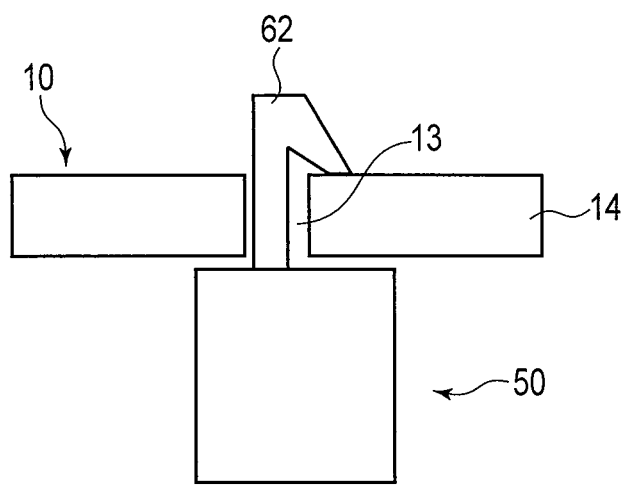
FIG. 4 is a sectional view of a device fixing part and its periphery showing a modification that fixes the cutoff valve to the resin block module with a hook.

FIG. 4 is a sectional view of a device fixing part and its periphery showing a modification that fixes the cutoff valve 10 to the resin block module 50 with a hook.

The resin block module 50 integrally formed with resin does not include the boss 55 and includes a hook 62 instead. Specifically, in the examples in FIGS. 2 and 3, using the boss 55 and fixing screw 40, the cutoff valve 10 has been fixed to the resin block module 50. However, in the example of FIG. 4, neither the boss 55 nor the fixing screw 50 is needed and the hook 62 is used instead. The cutoff-valve base plate 14 is caused to engage with the hook 62, thereby fixing the cutoff valve 10 to the resin block module 50.

Although the hook 62 has no downward binding force in FIG. 4, the cutoff-valve O-ring (large) 11 and cutoff-valve O-ring (small) 12 are constantly generating upward force in FIG. 4 near the large-diameter hole 13, providing sealing performance equal to that of screw fixing.

With the modification, neither the fixing screw 40 nor the like is used, making it easier to install and fix a device, such as the cutoff valve 10. In addition, even if a relative displacement has occurred due to a difference in linear expansion coefficient caused by the difference in material between the resin block module 50 and device, the hook 62 does not put their displacements under control. In addition, looseness does not take place due to relative displacements differently from screws. Therefore, it is possible to provide a fuel-cell power generation system which increases the manufacturability and the long-term reliability of screw fixing parts and a method of manufacturing the fuel-cell power generation system.

The techniques explained in the first embodiment can be applied to each of the embodiments explained later.

Second Embodiment

Figure 5:
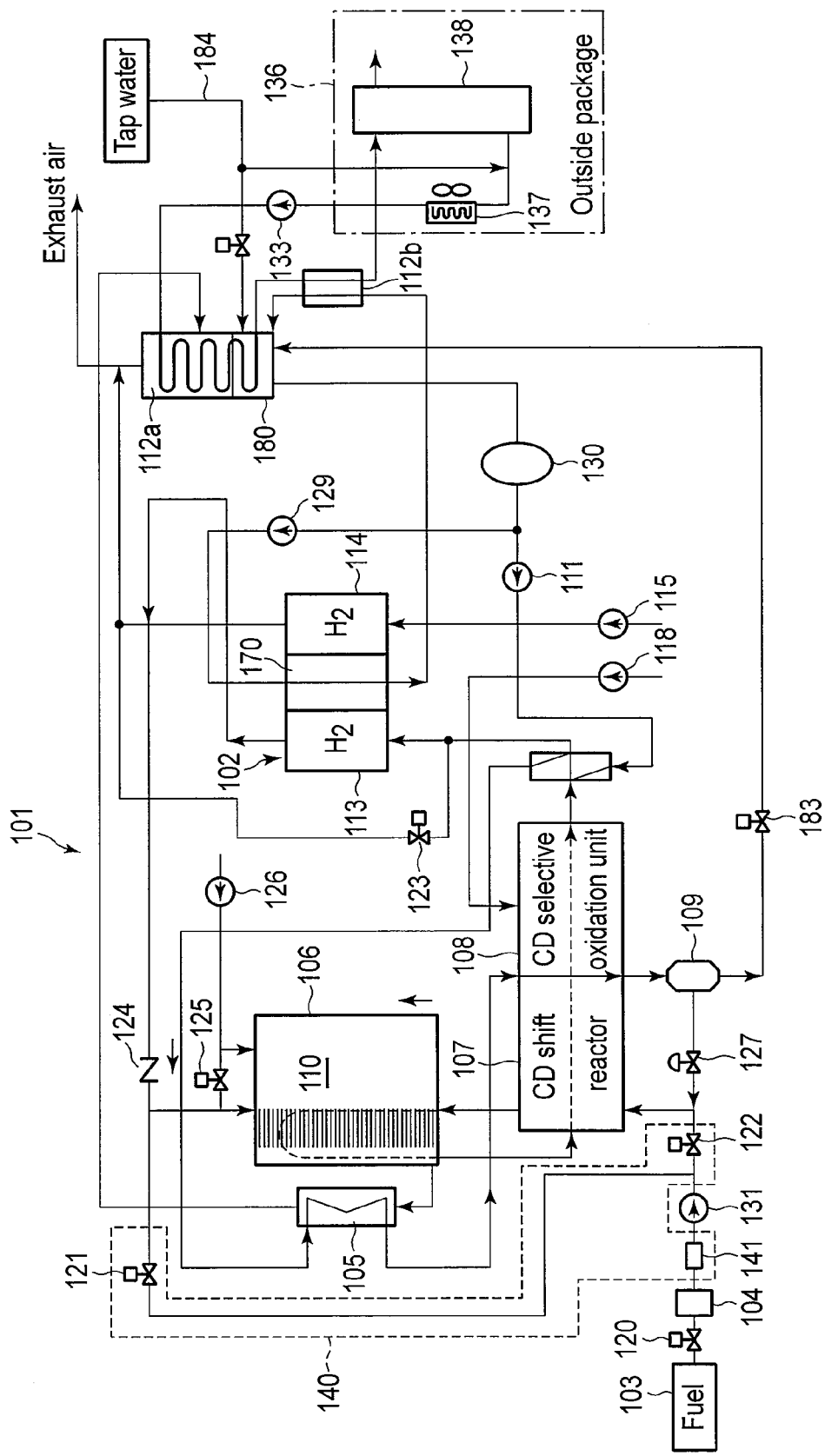
FIG. 5 is a schematic configuration diagram of a fuel-cell power generation system according to a second embodiment.

FIG. 5 is a schematic configuration diagram of a fuel-cell power generation system according to a second embodiment. The number of structural requirements constituting a fuel-cell power generation system disclosed in the specification may be singular or plural unless otherwise specified.

A fuel-cell power generation system 101 of the second embodiment is a polymer electrolyte fuel cell power generation system that includes a fuel reformer in a packaging. The fuel-cell power generation system 101 is applied to, for example, a household fuel-cell power generation system. In an explanation below, although the fuel-cell power generation system 101 of the second embodiment will be explained, taking a household fuel-cell power generation system as an example, it may be applied to one other than a household fuel-cell power generation system.

The fuel-cell power generation system 101 chiefly comprises a fuel processing system (FPS) and a cell stack assembly (CSA) 102.

The fuel processing system comprises fuel 103, a desulfurizer 104, a steam generation unit 105, a reformer 106, a CO shift reactor 107, a CO selective oxidation unit 108, a steam segregation unit 109, a reforming combustor 110, a reforming water pump 111, exhaust-heat heat exchangers 112a, 112b, a fuel flow meter 141, and a tank 180. The reforming combustor 110 is provided in the reformer 106. The fuel 103 is, for example, hydrocarbon series fuel, such as town gas or propane gas.

The cell stack assembly 102 comprises an anode 113 and a cathode 114. The anode 113 and cathode 114 are provided so as to sandwich a solid polymer electrolyte membrane between them. The cell stack assembly 102 includes a fuel cell that generates electricity by electrochemical reaction using fuel and an oxidizer. In the cell stack assembly 102, a cooling flow path 170 for cooling the cell stack assembly 102 is formed.

The principle of generating electricity with a polymer electrolyte fuel cell power generation system will be explained briefly.

When town gas is used as fuel, town gas is reformed into gaseous hydrogen at the fuel processing system. Town gas, fuel gas 103, passes through the desulfurizer 104. At this time, in the desulfurizer 104, sulfur content in the town gas is removed by, for example, activated carbon, zeolite adsorption, or the like. The town gas passed through the desulfurizer 104 passes through the reformer 106.

Purified water supplied from the tank 180 by the reforming water pump 111 via the filter 130 is heated by the steam generation unit 105 for gasification. Only steam is extracted from gas sent from the steam generation unit 105 to the steam segregation unit 109. The extracted steam passes through a steam flow control valve 127 and joins desulfurized fuel gas. Liquid-water segregated at the steam segregation unit 109 is sent to the tank 180 via a valve 183. Exhaust air from the reformer 106 is sent to the steam generation unit 105, heats water, is sent to the exhaust-heat heat exchanger 112 provided in parallel with the tank 180, and is then discharged.

The reformer 106 produces hydrogen from reaction between town gas and steam by a catalyst and, at the same time, produces CO. Since the steam reforming is an endothermal reaction, the reformer 106 includes the reforming combustor 110. That is, the reforming combustor 110 heats the inside of the reformer 106, thereby keeping a steam reforming reaction, an endothermal reaction.

Since the polymer electrolyte fuel cell has the problem of CO poisoning at the membrane electrode assembly (MEA) composed of an electrolyte membrane and a catalyst layer in the cell stack assembly 102, CO has to be oxidized into $CO_2$. Therefore, it is necessary to promote a shift reaction with $H_2O$ at the CO shift reactor 107. In addition, it is necessary to promote an oxidation reaction at the CO selective oxidation unit 108 by the supply of air from a CO selective oxidation air blower 118 to the extent a catalyst does not cause CO poisoning.

Although not shown for simplicity, these catalytic reaction temperatures including the reformer differ from one another. The temperature difference between the upstream and downstream of the reformed gas is large in such a manner that the catalytic reaction temperature at the reformer 106 is at several hundred degrees and that at the CO selective oxidation unit 108 is at a hundred and several tens of degrees.

Therefore, a heat exchanger may be provided to lower the temperature on the downstream side.

Next, principal reactions with each catalyst will be described below.

When town gas made mainly of methane components is reformed, a steam reforming reaction satisfies equation (1), a CO shift reaction satisfies equation (2), and a CO selective oxidation reaction satisfies equation (3):

$$CH_4 + 2H_2O \rightarrow CO_2 + 4H_2 \qquad (1)$$

$$CO + H_2O \rightarrow CO_2 + H_2 \qquad (2)$$

$$2CO + O_2 \rightarrow 2CO_2 \qquad (3)$$

The reformed gas passed through the CO selective oxidation unit 108 includes mainly hydrogen, gaseous carbon dioxide, excess steam, and the like. These gases are sent to the anode 113.

Gaseous hydrogen sent to the anode 113 goes through the catalyst layer of the MEA. Then, protons H⁺ pass through the electrolyte membrane and combine with oxygen and electrons in the air caused to pass through the cathode 114 by a cathode-electrode air blower 115, thereby producing water.

Therefore, the anode 113 acts as a negative electrode and the cathode 114 acts as a positive electrode, generating a direct-current voltage with a potential. If an electric load is connected across the potential, causing the present system to have a power supply function.

The outlet gas not used for power generation and left at the anode 113 is used as heating fuel gas for the steam generation unit 105 and reformer 106. In addition, the exhaust-heat heat exchanger 112a recovers moisture from steam at the outlet of the cathode 114 and steam in the exhaust gas, thereby achieving a self-sustained water system.

On the other hand, the exhaust-heat heat exchanger 112b arranged in a circulation line of a cell cooling water pump 129 passing through a cooling flow path 170 recovers heat from the exhaust heat of the cell stack assembly 102.

A hot-water circulating pump 133 operates to cause hot water heated by heat exchange at the exhaust-heat heat exchangers 112a and 112b to be accumulated in heat in a hot-water cylinder 138 in a heat storage tank 136. The accumulated hot water is used as hot-water supply or hot water for a bath. If necessary, tap water is supplied to the hot-water cylinder 138 via a water pipe 184.

When heat in the hot-water cylinder 138 has not been used and high-temperature water has accumulated up to the lower part of the tank 180, the temperature of circulating water returning to the fuel-cell power generation system 101 rises. In that case, the operation of the system is stopped until the hot water is used, or heat is released into the atmosphere via a radiator 137.

Next, an operating method in starting up the fuel-cell power generation system of the second embodiment will be explained.

When an operation start instruction has begun, a combustion air blower 126 is started up with the combustion air switching valve 125 being open, thereby purging air from a combustion chamber in the reformer 106. In this case, the combustion air blower 126 supplies combustion air not only as pre-mixed air for startup fuel but also as diffusing air to the combustion chamber. When air purging has been completed, sparks for igniting startup fuel, for example, sparks from a spark plug, are produced in the combustion chamber.

With a main fuel cutoff valve 122 being closed and a degassing cutoff valve 123 being opened, when a fuel inlet cutoff valve 120 and a startup fuel cutoff valve 121 are opened, startup fuel passed through the fuel inlet cutoff valve 120 and startup fuel cutoff valve 121 is raised in pressure and ignited in the combustion chamber, thereby producing a flame. The flow rate of fuel sent from the desulfurizer 104 to a fuel pressure rising blower 131 is measured with the fuel flow meter 141.

A burner used in the combustion chamber is an integrated burner capable of both startup and electric power generation. Startup fuel mainly consisting of methane is slower in burning speed and more liable to blow out than fuel mainly consisting of hydrogen, offgas fuel in generating electricity. Therefore, in the second embodiment, premixed burning is performed to improve combustion quality.

When the burning has been continued and the reformer 106 heated by combustion gas and the CO shift reactor 107, CO selective oxidation unit 108, steam segregation unit 109, and the like heated by an electric heater or the like (not shown) have reached a specific temperature, reformed water supplied by the reforming water pump 111 to the steam segregation unit 109 turns into steam there. Then, after the steam flow control valve 127 is opened and the steam is supplied to a fuel reforming line, the steam is supplied together with fuel supplied as a result of the main fuel cutoff valve 122 being opened into the fuel processing system, thereby starting a reforming reaction. With this timing, the startup fuel cutoff valve 121, degassing cutoff valve 123, and combustion air switching valve 125 are closed.

After a reforming reaction has started, reformed gas that has been oxidized with air from a CO selective oxidation air blower 118 and has flowed from the outlet of the CO selective oxidation unit 108 chiefly consists of hydrogen, gaseous carbon dioxide, steam and the like, and is supplied to the anode 113 of the cell stack assembly 102.

Offgas that has flowed from the outlet of the anode 113 passes through an offgas check valve 124 and is then supplied to the reforming combustor 110. Offgas fuel supplied to the reforming combustor 110 is ignited and starts stable diffusing combustion together with main fuel air.

After that, when the cathode-electrode air blower 115 has supplied air to the cathode 114 of the cell stack assembly 102, starting up an inverter (not shown), the fuel-cell power generation system 101 starts to generate electricity. Offgas flowing from the outlet of the anode 113 left without contributing to power generation continues to be supplied to the reforming combustor 110.

The fuel-cell power generation system 101 of the second embodiment comprises a resin block module. The resin block module includes a flow path through which fluid (fuel, air, or water) flows. Inner walls defining the flow path are made of resin. Such a resin block module is formed using, for example, resin molding.

Figure 6:
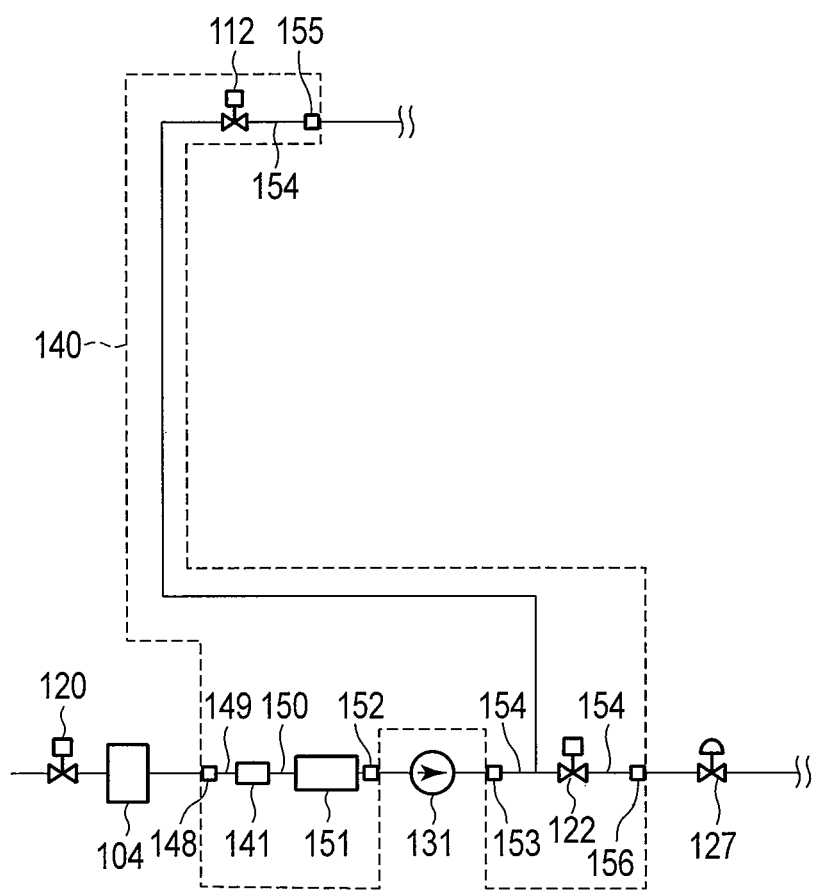
FIG. 6 is a configuration diagram of a resin block module of the fuel-cell power generation system according to the second embodiment.

In the second embodiment, a resin block module (resin module) 140 is shown by a part enclosed with a broken line in FIG. 5. FIG. 6 is a more concrete configuration diagram of the resin block module 140. FIG. 7 is a plan view (a front view at the time of installation) of the resin block module 140 of FIG. 6. FIG. 8 is a front view of the resin block module 140 of FIG. 6.

The resin block module 140 of the second embodiment is provided with the startup fuel cutoff valve (electromagnetic valve) 121, main fuel cutoff valve (electromagnetic valve) 122, and fuel flow meter 141. Devices provided on the resin block module 140 are not limited to the electromagnetic valves 121, 122, and fuel flow meter 141. For instance, the resin block module 140 may be configured to be provided with at least one of a plurality of devices, including electromagnetic valves, flow meters, and orifices. Similarly, in the second embodiment, although the electromagnetic valves 121, 122 and flow meter 41 have been configured to be mounded (installed) via O-rings, they are not restricted to this. For instance, devices mounted (installed) via O-rings may be configured to include at least one of a plurality of devices, including electromagnetic valves, flow meters, and orifices.

In addition, the resin block module 140 comprises resin piping parts (flow path units) 149, 150, 154 made of resin as shown in FIGS. 6 to 8. The resin block module 140 further comprises a fuel flow meter O-ring 142, a cutoff valve O-ring (large) 143, and a cutoff valve O-ring (small) 144 for sealing the resin piping parts (flow path units) 150, 154 as shown in FIG. 7. The resin block module 140 and the devices 121, 122, 141 are fixed to one another via O-rings with screws (not shown).

Furthermore, on the outside of the resin block module 140, there are, for example, a relay connector board (child board) 145 and a plurality of supporting parts 146 that fix other devices, including heat exchange filters and air filters, in place as shown FIG. 7.

The relay connector board 145 means a board for connecting wiring lines of a device that requires power for a rotating machine or the like, such as junction lines for connecting power and control signals for the fuel pressure rising blower 131.

Although the resin block module 140 is installed in a packaging and screwed to, for example, a leg part 147, this is illustrative only.

Fuel passed through the desulfurizer 104 after the fuel inlet cutoff valve 120 has been opened is supplied from a fuel flow meter inlet hookup 148 into the resin block module 140. Although the fuel inlet cutoff valve 120 is actually a double cutoff valve, it is simplified as a single valve in FIG. 7.

Fuel passes through the fuel flow meter 141 and enters the resin piping part 150. Then, the fuel goes through a buffer tank unit (buffer unit) 151 whose cross-sectional area is larger than that of the resin piping part 150 and temporarily goes outside the resin block module 140 from a buffer tank outlet hookup (outlet hookup) 152.

The fuel is supplied via the fuel pressure rising blower 131 from a fuel cutoff valve inlet hookup (inlet hookup) 153 into the resin block module 140 again.

Each fuel branches at a resin piping part 154 and enters the startup fuel cutoff valve 121 and main fuel cutoff valve 122. Its flow is determined by open-close control of each cutoff valve. The fuel is directed to a connecting pipe (not shown) outside the resin block module 140 from a startup fuel cutoff valve outlet hookup (outlet hookup) 155 at the time of start up and from a main fuel cutoff valve outlet hookup (outlet hookup) 156 in a normal operation.

Here, the fuel flow meter inlet hookup 148, buffer tank outlet hookup 152, fuel cutoff valve inlet hookup 153, startup fuel cutoff valve outlet hookup 155, and main fuel cutoff valve outlet hookup 156 are external piping hookups of the resin block module 140. They are all female quick-fastener ferrules (quick-fastener structures). Each of them is O-ring sealed with a counterpart mail ferrule, thereby being connected with an external connecting pipe. A quick-fastener ferrule is a pipe connector metal fitting that features the SUS spring property.

However, the resin block module side need not necessarily have a female structure as in the second embodiment. A part or all of the resin block modules may have a mail structure so as to meet counterpart ferrules' conditions.

Lid weld parts of the resin block module 140 include a buffer tank weld lid 157, a startup fuel cutoff valve weld lid 158, a main fuel cutoff valve weld lid 159, and a resin piping part lid (not shown). The buffer tank weld lid 157 is formed by vibration welding from the side surface. The startup fuel cutoff valve weld lid 158 and main fuel cutoff valve weld lid 159 are formed by vibration welding from the top surface. The resin piping part lid is formed by vibration welding from the underside surface. That is, a method of manufacturing a fuel-cell power generation system according to an embodiment is characterized in that the resin module and a weld member are welded together by vibration welding in a fuel-cell power generation system characterized by comprising a fuel cell that generates electricity by electrochemical reactions using fuel and an oxidizer and a resin module that includes flow paths through which fuel, air, or water flows and whose inner walls defining the flow paths are made of resin.

The startup fuel cutoff valve 121 is fixed to the startup fuel cutoff valve weld lid 158 with screws (not shown) via O-rings 143, 144. Similarly, the main fuel cutoff valve 122 is fixed to the main fuel cutoff valve weld lid 159 with screws (not shown) via O-rings 143, 144.

FIG. 9 is an enlarged view of part A enclosed by a circle in FIG. 7. In FIG. 9, number 161 indicates a welded surface between the resin block module 140 and weld lids 158/159. The welded surface 161 is so formed (by vibration welding) that frictional heat produced by vibration on the weld lid 158/159 side causes the weld lids 158/159 to be welded to the resin block module 140. At this time, vibration welding produces swarf. In the second embodiment, as shown in FIG. 9, a block inner trap part (space) 162 and a block outer trap part (space) 163 are provided as swarf sealing parts that trap swarf in adjacent parts of the welded surface 161. Therefore, swarf produced by vibration welding is trapped and sealed in the trap parts 162, 163. This enables the outflow of swarf into the flow paths to be suppressed sufficiently.

There is no risk of swarf being produced outside the block (or swarf flowing into the flow paths), the block outer trap part 163 can be omitted.

While in the second embodiment, a resin block module has been provided for the fuel inlet part, it may be applied to the air-system piping or water-system piping. A single system may be composed of a plurality of similar resin block modules.

The second embodiment produces the following effects as compared with a conventional household fuel-cell power generation system.

At least one resin block module in which a plurality of flow paths (pipes) are gathered (as a subassembly) is provided in a fuel-cell power generation system, enabling the entire system to be made lighter and more compact. For example, the fuel-cell power generation system can be made about 20% smaller in size than a conventional equivalent that includes, for example, metal piping or the like. As a result, the installability of the fuel-cell power generation system is improved, helping the reduction of $CO_2$, which leads to the popularization and spread of an environmentally friendly fuel-cell power generation system.

In addition, using a quick fastener ferrule structure with O-ring sealing as a connection structure with the external piping of a resin block module improves not only the manufacturability of the resin block but also that of the entire system.

When polyphenylene sulfide (PPS) is used as resin material for the technique for realizing the resin block module and the body is welded to a lid part by vibration welding, PPS can be applied sufficiently not only to a fuel line but also another piping system because it has a high flame resistance, a better non-elution characteristic, and a high upper temperature limit. For example, since the better non-elution characteristic prevents resin components from dissolving in water flowing in the flow paths, making it easy to apply PPS to a water piping system. As a result, use of poor-transparency PPS enables a low-translucency resin block module to be realized. This prevents fluid (for example, fuel) flowing in the flow paths in the resin block module from being influenced by light.

As for the processing of formed swarf which becomes a problem in vibration welding, swarf can be trapped in the trap parts adjacent to the welded surface and therefore the risk of swarf flowing into the resin piping part in the block can be avoided.

In addition, since vibration welding enables a welded surface to be made wider arbitrarily, the internal pressure strength of a pipe can be made higher than, for example, an ultrasonic welding method.

In the case of the resin block module 140 of the second embodiment, the fuel pressure rising blower 131 lies in a flow path of fuel. The fuel pressure rising blower 131 causes pulsation. The pulsation contributes to making an error in an indicated value on the fuel flow meter 141. Such an error in the indicated value on the fuel flow meter 141 can be made sufficiently small by the buffer tank unit 151 provided in the resin block module 140.

Furthermore, in the conventional art, to solve the problem of an error in an indicated value, a buffer tank provided separately from the fuel-cell power generation system was needed. However, in the second embodiment, the buffer tank unit 151 has been provided in the resin block module 140 as described above, the separately provided buffer tank is not needed, preventing the cost from rising.

Outside the resin block module 140, there are a plurality of supporting parts 146 for holding (installing) external devices, including heat exchangers. The holding parts 146 enable the relay connector board 145 to be installed and fixed in place, making it possible to increase the packaging integration degree of the system.

Accordingly, with the configuration of the second embodiment, a fuel-cell power generation system with a remarkably improved manufacturability and size reduction can be installed and a small-footprint, energy saving, economically efficient household fuel-cell power generation system which suppresses the initial cost as much as possible can be provided.

In a fuel-cell power generation system that obtains hydrogen from hydrocarbon series fuel, such as town gas, and generates electricity, many devices and meters for chemical reaction processes to obtain hydrogen are needed. Therefore, there are many pipes that connect them.

Presently, a large package size is attributable not only to the size of each of the devices and meters but also to the presence of many pipes. In addition, the reason why the system price does not decrease is that there are many pipes and large expenses are needed to assemble them.

Figure 20:
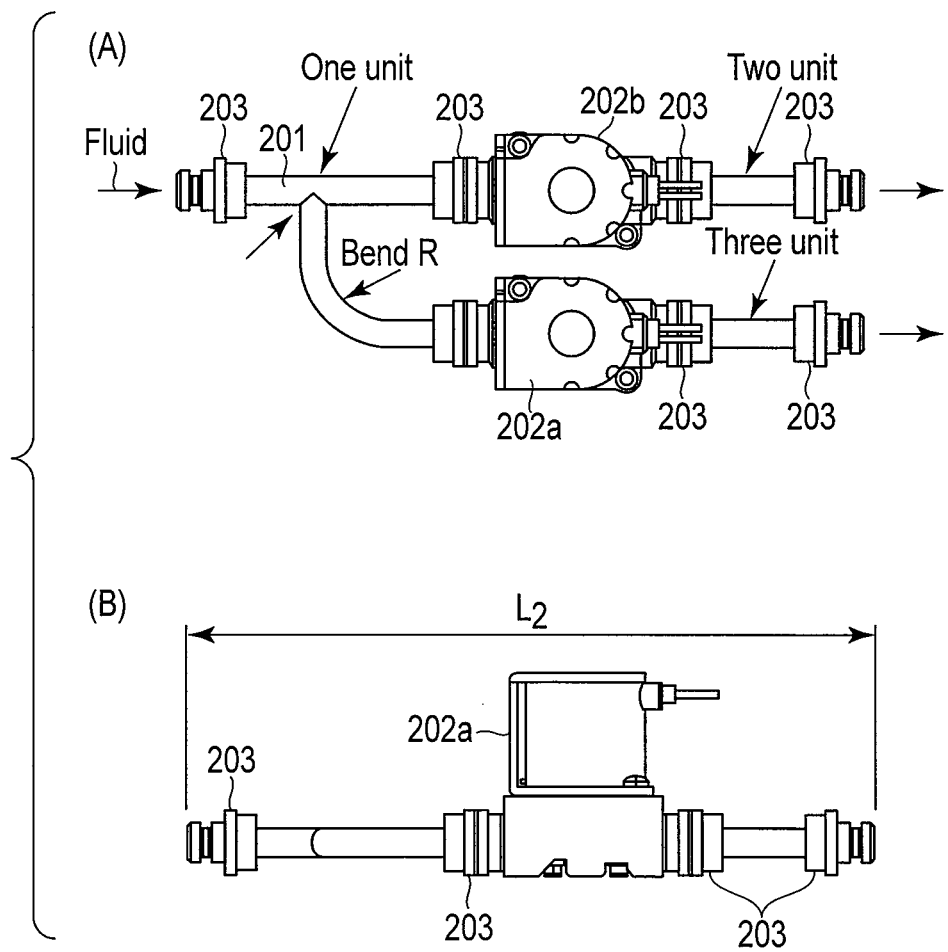
FIG. 20 is a diagram to explain a configuration of a conventional pipe fitting.

FIG. 20 (A), (B) show a configuration of piping in the conventional art. FIG. 20 (A) is a plan view and FIG. 20 (B) is a side view of FIG. 20 (A).

As for the flow, fluid flowing from left to right in FIG. 20 is designed to be branched at a pipe 201 and flow through a line with a cutoff valve 202a and through a line with a cutoff valve 202b. When metal is used as a material for the pipe 201, ferrules 203 are welded to both ends of the pipe 201. To perform branching, pipes are welded together. Alternatively, bending work is done to align a pipe with the installation position of a device.

The welding of pipes and the bending work require a pipe length for welding. In addition, to bend a pipe, a bend R corresponding to a pipe diameter is needed. As a result, a lot of spaces are needed for piping. Moreover, the number of man-hours and the number of components for producing pipes have been increased, leading to an increase in the parts cost and an increase in the assembly cost to assemble them.

In a third to a ninth embodiment below, examples of a fuel-cell power generation system capable of reducing a space for piping remarkably will be explained.

Third Embodiment

Figure 10:
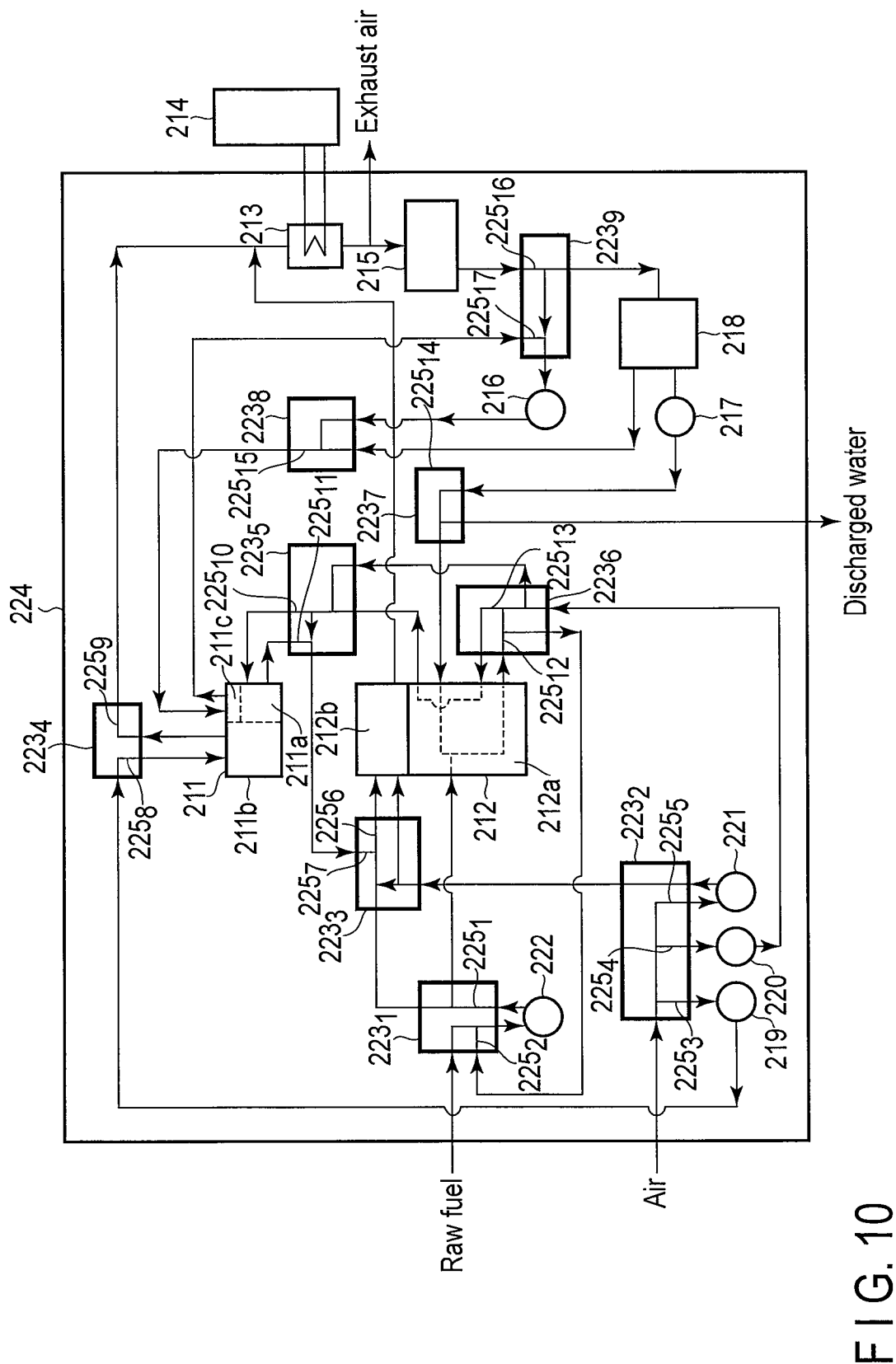
FIG. 10 is a block diagram of a fuel-cell power generation system according to a third embodiment.

A fuel-cell power generation system according to a third embodiment will be explained with reference to FIG. 10, FIGS. 11 (A), (B), FIGS. 12 (A), (B), and FIG. 13. FIG. 10 is a block diagram of an entire fuel-cell power generation system according to the third embodiment. FIG. 11 is an explanatory diagram of an integrated pipe fitting. FIG. 11 (A) is a plan view and FIG. 11 (B) is a side view. FIG. 12 is a configuration diagram of the flow paths of the integrated pipe fitting. FIG. 12 (A) is a plan view and FIG. 12 (B) is a side view. FIG. 13 shows a concrete example of the configuration of a sixth integrated pipe fitting.

The fuel-cell power generation system comprises a fuel cell stack assembly 211 and a reformer 212. The fuel cell stack assembly 211 comprises an anode 211a, a cathode 211b, an electrolyte membrane (not shown), and a cooling layer 211c for suppressing heat generation as a result of electric power generation by the fuel cell stack assembly 211. Electric energy is generated by supplying hydrogen-rich gas to the anode 211a and air to the cathode 211b. In addition, a trace amount of air is supplied together with reformed gas to the anode 211a.

The reformer 212 comprises a reforming unit 212a that produces hydrogen-rich gas necessary for the anode 211a from raw fuel, such as town gas, and a burner unit 212b for generating heat necessary for chemical reaction at the reforming unit 212a. The reformer 212 includes a desulfurization agent (not shown) for removing corrupt smell chemicals, such as sulfur included in raw fuel, such as town gas. A part of gaseous hydrogen produced at the reforming unit 212a is supplied as recycled gas to the desulfurization agent.

The reforming unit 212a generally causes a reforming reaction by steam reforming, a carbon monoxide shift reaction, and a carbon monoxide selective reaction. Their chemical reaction formulas are as follows. Air is supplied to the reforming unit 212a for a selective oxidation reaction.

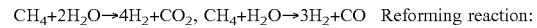

Reforming reaction: $CH_4 + 2H_2O \rightarrow 4H_2 + CO_2$, $CH_4 + H_2O \rightarrow 3H_2 + CO$

Shift reaction: $CO + H_2O \rightarrow H_2 + CO_2$

Selective oxidation reaction: $CO + (\frac{1}{2})O_2 \rightarrow CO_2$

The fuel-cell power generation system comprises not only the fuel cell stack assembly 211 and reformer 212 but also a heat exchanger 213, a hot-water cylinder 214, a cooling water tank 215, a cooling water pump 216, a reformed water pump 217, an ion-exchange resin layer 218, a cathode air blower 219, a selective oxidation blower 220, a burner air blower 221, a raw fuel blower 222, and first to ninth integrated pipe fittings that connect various devices of the fuel-cell power generation system 223$_1$, 223$_2$, 223$_3$, 223$_4$, 223$_5$, 223$_6$, 223$_7$, 223$_8$, 223$_9$.

The heat exchanger 213 transfers heat from exhaust air from the cathode 211b and that from the burner unit 212b. The heat is accumulated in the hot-water cylinder 314 and used for hot-water supply, heating, or the like. The exhaust air from the cathode 211b and that from the burner unit 212b subjected to heat exchange at the heat exchanger 213 are discharged outside a fuel cell package 224. Cooling water is circulated by the cooling water pump 216 through the cooling layer 211c of the fuel cell stack assembly 211. The cooling water tank 215 is coupled to the heat exchanger 213 with pipes. Condensed water produced at the heat exchanger 213 is accumulated in the cooling tank 215.

The configurations of the first to ninth integrated pipe fittings $223_1$ to $223_9$ are as follows.

The first integrated pipe fitting $223_1$ includes a first flow path $225_1$ which supplies raw fuel to the reforming unit 212a and the burner unit 212b in the reformer 212 and a second flow path $225_2$ through which reformed gas discharged from the reformer 212 flows. The second integrated pipe fitting $223_2$ includes a third flow path $225_3$ which supplies air to the cathode 211b of the fuel cell stack assembly 211, a fourth flow path $225_4$ which supplies air to the reforming unit 212a of the reformer 212, and a fifth flow path $225_5$ which supplies air to the burner 212b of the reformer 212.

The third integrated pipe fitting $223_3$ includes a sixth flow path $225_6$ which supplies raw fuel and air to the burner unit 212b and a seventh flow path $225_7$ through which anode offgas discharged from the anode 211a of the fuel cell stack assembly 211 flows. The fourth integrated pipe fitting $223_4$ includes an eighth flow path $225_8$ which supplies air to the cathode 211b of the fuel cell stack assembly 211 and a ninth flow path $225_9$ through which cathode offgas discharged from the cathode 211b of the fuel cell stack assembly 211 flows. The fifth integrated pipe fitting $223_5$ includes a tenth flow path $225_{10}$ through which reformed gas and air to the fuel cell stack assembly 211 flows and an eleventh flow path $225_{11}$ through which anode gas from the anode 211a flows.

The sixth integrated pipe fitting $223_6$ includes a twelfth flow path $225_{12}$ through which reformed gas discharged from the reformer 212 flows and a thirteenth flow path $225_{13}$ through which air to be supplied to the reforming unit 212a and anode 211a flows. As shown in FIG. 13, the sixth integrated pipe fitting $223_6$ includes cutoff valves 226a, 226b, orifices 227a, 227b, 227c, a buffer tank 228, and a flow meter 229. The twelfth flow path $225_{12}$ branches at a halfway point. Reformed gas supplied to one branched pipe 230 passes through a cutoff valve 226a and an orifice 227 and is discharged to the first integrated pipe fitting $223_1$. Air supplied from the second integrated pipe fitting $223_2$ to the sixth integrated pipe fitting $223_6$ by the selective oxidation blower 220 not only passes through the buffer tank 228, orifice 227b, flow meter 229, cutoff valve 226b and is supplied to the reforming unit 212a of the reformer 212, but also passes through the cutoff valve 226b and then through the orifice 227c and is supplied to the fifth integrated pipe fitting $223_5$.

The seventh integrated pipe fitting $223_7$ includes a fourteenth flow path $225_{14}$ which supplies cooling water to the reformer 212. The eighth integrated pipe fitting $223_8$ includes a fifteenth flow path $225_{15}$ which supplies cooling water to the cooling layer 211c of the fuel cell stack assembly 211. The ninth integrated pipe fitting $223_8$ includes a sixteenth flow path $225_{16}$ which supplies cooling water to the cooling layer of the fuel cell stack assembly 211 and the reforming unit 212a of the reformer 212 and a seventeenth flow path $225_{17}$ through which cooling water discharged from fuel cell stack assembly flows.

The integrated pipe fitting, for example, the first integrated pipe fitting $223_1$, is provided with the cutoff valves 226a, 226b on its top as shown in FIGS. 11 (A), (B). The integrated pipe fitting, for example, the first integrated pipe fitting $223_1$, is formed such that flow paths for fluid are configured inside a quadrilateral block part 227 as shown in FIGS. 12 (A), (B). Arrow X in FIG. 12 (B) indicates an inlet and outlet for fluid to and from the cutoff valve 226a.

An integrated pipe fitting block part as shown in FIG. 12 is effective in being formed by metal molding with nonmetallic materials from the viewpoint of production cost. As for nonmetallic materials, for example, polypropylene or polysulphide is effective in terms of functionality, moldability, distributability, and cost. In addition, as flow path formation means, not only general molding techniques, including a slide construction method and a lid structure, but also vibration welding or ultrasonic welding are used.

The third embodiment is so configured that the first to ninth integrated pipe fittings $223_1$ to $223_9$ are used to connect with the corresponding members, enabling a space for piping to be reduced remarkably. Specifically, if length $L_1$ of a conventional pipe (FIG. 20) in a lateral direction is 1, use of an integrated pipe fitting enables length $L_2$ of the integrated pipe fitting $223_1$ of FIG. 11 to be reduced to 0.6. As for the number of parts, a conventional equivalent requires three pipes, but the third embodiment can be configured using a single pipe. Although an integrated pipe fitting has been simplified in FIG. 11, an actual fuel-cell power generation system has a more complicated configuration. For example, as with the sixth integrated pipe fitting $223_6$ in FIG. 13, the larger the number of functions added to the integrated pipe fitting, the greater the effect of the integrated pipe. As described above, with the third embodiment, the space for piping can be reduced remarkably, enabling cost reduction. In addition, the welding of ferrules for connecting pipes to devices, the welding of pipes, and bending work on a pipe can be omitted as in the conventional art, improving workability.

Fourth Embodiment

A fuel-cell power generation system according to a fourth embodiment will be explained with reference to FIG. 14. The same members as those in FIGS. 10 to 13 are indicated by the same reference numbers and an explanation of them will be omitted.

The fuel-cell power generation system according to the fourth embodiment is characterized by comprising a tenth integrated pipe fitting 241 which has both of the functions of the sixth and seventh integrated pipe fittings instead of using the sixth and seventh integrated pipe fittings in the fuel-cell power generation system of FIG. 10. Specifically, the tenth integrated pipe fitting 241 includes a first flow path $241_1$ through which reformed gas discharged from the reforming unit 212a of the reformer 212 flows, a second flow path $241_2$ through which air to be supplied to the reforming unit 212a and anode 211a flows, and a third flow path $241_3$ which supplies cooling water to the reforming unit 212a.

The fourth embodiment can further eliminate one integrated pipe fitting as compared with the third embodiment, enabling a space for piping to be reduced more.

Fifth Embodiment

A fuel-cell power generation system according to a fifth embodiment will be explained with reference to FIG. 15. The same members as those in FIGS. 10 to 14 are indicated by the same reference numbers and an explanation of them will be omitted.

Figure 14:
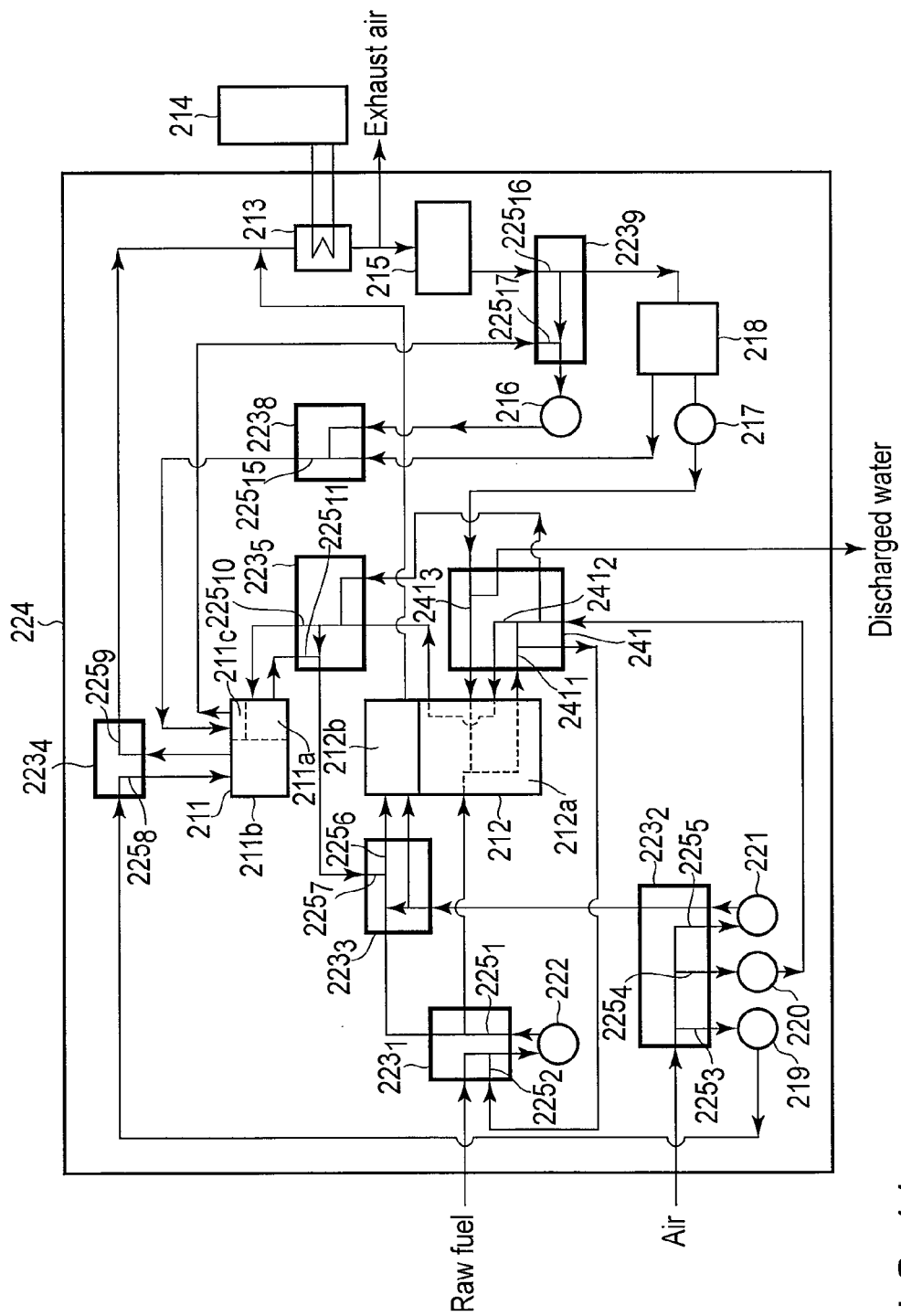
FIG. 14 is a block diagram of a fuel-cell power generation system according to a fourth embodiment.

The fuel-cell power generation system according to the fifth embodiment is characterized in that the fourth integrated pipe fitting $223_4$ and fifth integrated pipe fitting $223_5$ have the function of the eighth integrated pipe fitting instead of using the eighth integrated pipe fitting in the fuel-cell power generation system of FIG. 14. Specifically, the fourth integrated pipe fitting $223_4$ includes not only an eighth flow path $225_8$ which supplies air to the cathode $211b$ of the fuel cell stack assembly 211 and a ninth flow path $225_9$ through which cathode offgas discharged from the cathode $211b$ of the fuel cell stack assembly 211 but also a flow path through which cooling water to be supplied to the cooling layer $211c$ of the fuel cell stack assembly 211 flows. The fifth integrated pipe fitting $223_5$ includes not only a tenth flow path $225_{10}$ through which reformed gas and air to the fuel cell stack assembly 211 flows and an eleventh flow path $225_{11}$ through which anode offgas from the anode $211a$ flows but also a flow path 243 through which cooling water flows.

The fifth embodiment can further eliminate one integrated pipe fitting as compared with the fourth embodiment, enabling a space for piping to be reduced more.

Sixth Embodiment

A fuel-cell power generation system according to a sixth embodiment will be explained with reference to FIG. 16. The same members as those in FIGS. 10 to 15 are indicated by the same reference numbers and an explanation of them will be omitted.

Figure 15:
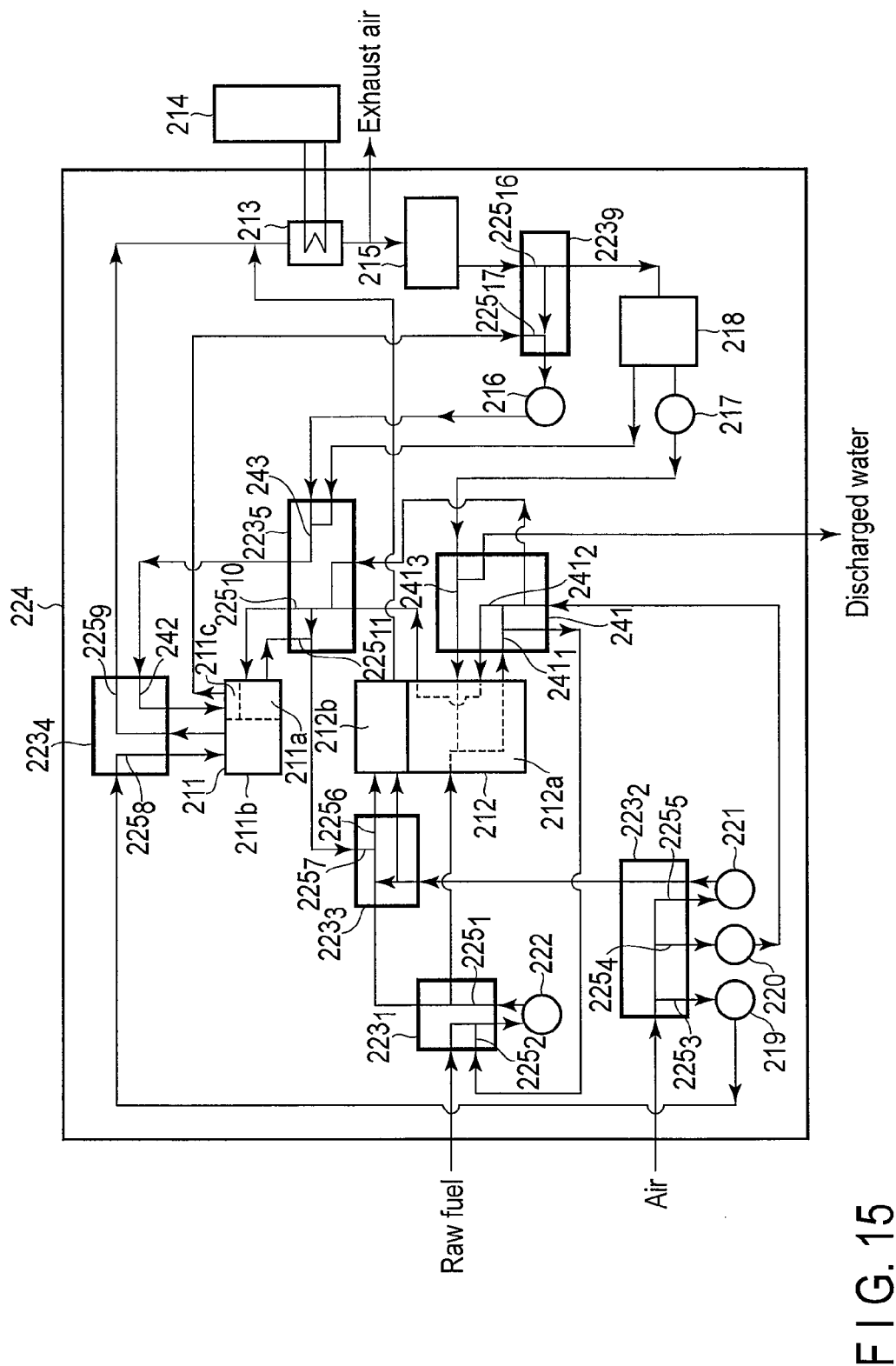
FIG. 15 is a block diagram of a fuel-cell power generation system according to a fifth embodiment.

The fuel-cell power generation system according to the sixth embodiment is characterized by comprising an eleventh integrated pipe fitting 244 which has both of the functions of the first and third integrated pipe fittings instead of using the first and third integrated pipe fittings in the fuel-cell power generation system of FIG. 15.

Specifically, the eleventh integrated pipe fitting 244 includes a first flow path $225_1$ which supplies raw fuel to the reforming unit $212a$ and burner unit $212b$ in the reformer 212, a second flow path $225_2$ through which reformed gas discharged from the reformer 212 flows, a sixth flow path $225_6$ which supplies raw fuel and air to the burner unit $212b$, and a seventh flow path $225_7$ through which anode offgas discharged from the anode $211a$ of the fuel cell stack assembly 211 flows.

The sixth embodiment can further eliminate one integrated pipe fitting as compared with the fifth embodiment, enabling a space for piping to be reduced more.

Seventh Embodiment

Figure 17:
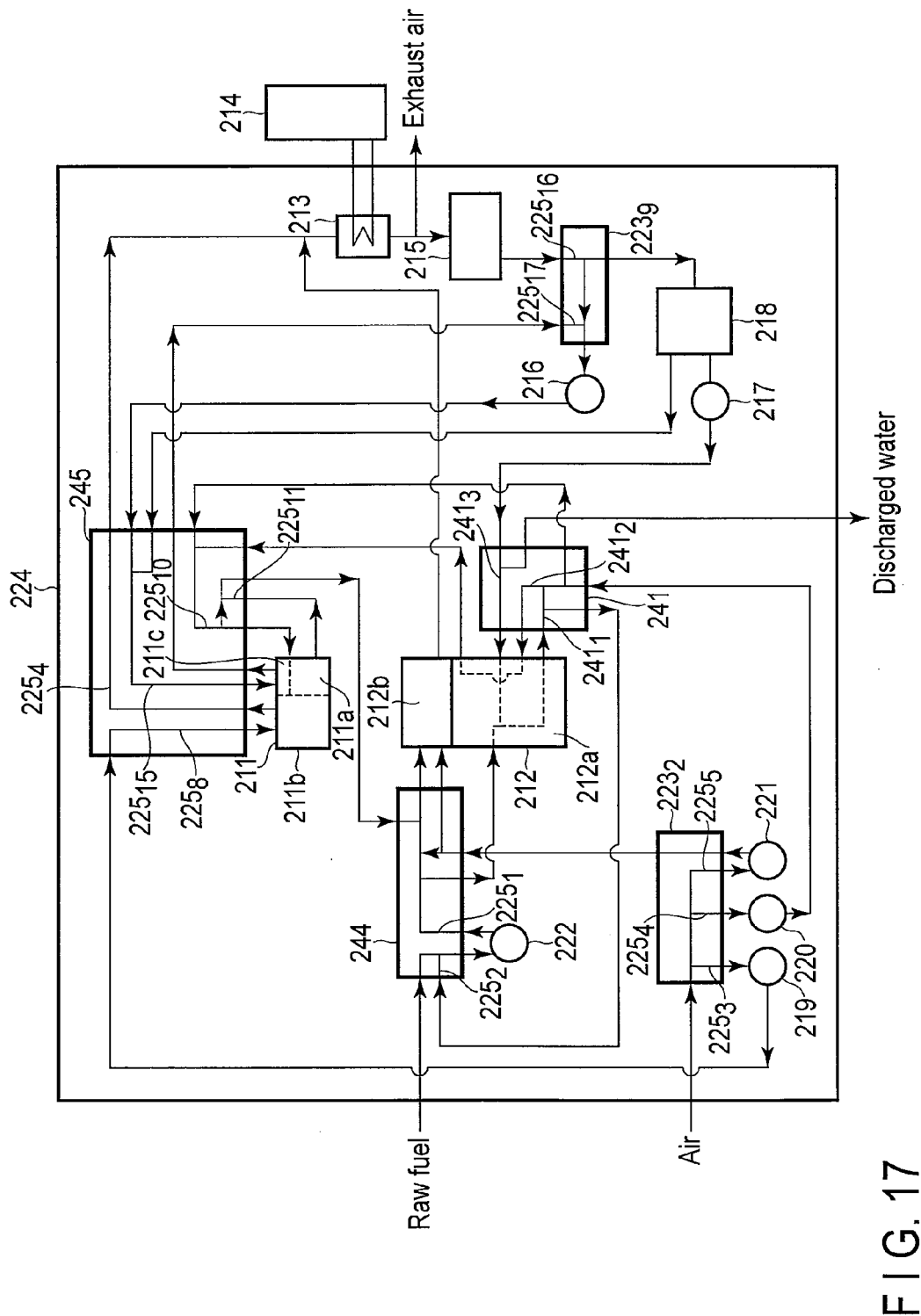
FIG. 17 is a block diagram of a fuel-cell power generation system according to a seventh embodiment.

A fuel-cell power generation system according to a seventh embodiment will be explained with reference to FIG. 17. The same members as those in FIGS. 10 to 16 are indicated by the same reference numbers and an explanation of them will be omitted.

The fuel-cell power generation system according to the seventh embodiment is characterized by comprising a twelfth integrated pipe fitting 245 which has both of the functions of the fourth integrated pipe fitting $223_4$ and fifth integrated pipe fitting $223_5$ instead of using the fourth and fifth integrated pipe fittings in the fuel-cell power generation system of FIG. 16. The twelfth integrated pipe fitting 245 has the functions of the fourth, fifth, and eighth integrated pipe fittings in the fuel-cell power generation system of FIG. 10.

Specifically, the twelfth integrated pipe fitting 245 includes an eighth flow path $225_8$ which supplies air to the cathode $211b$ of the fuel cell stack assembly 211, a ninth flow path $225_9$ through which cathode offgas discharged from the cathode $211b$ of the fuel cell stack assembly 211 flows, a tenth flow path $225_{10}$ through which reformed gas and air to the fuel cell stack assembly 211 flows, an eleventh flow path $225_{11}$ through which anode offgas from the anode $211a$ flows, and a fifteenth flow path $225_{15}$ which supplies cooling water to the cooling layer $211c$ of the fuel cell stack assembly 211.

The seventh embodiment can further eliminate one integrated pipe fitting as compared with the sixth embodiment, enabling a space for piping to be reduced more.

Eighth Embodiment

Figure 18:
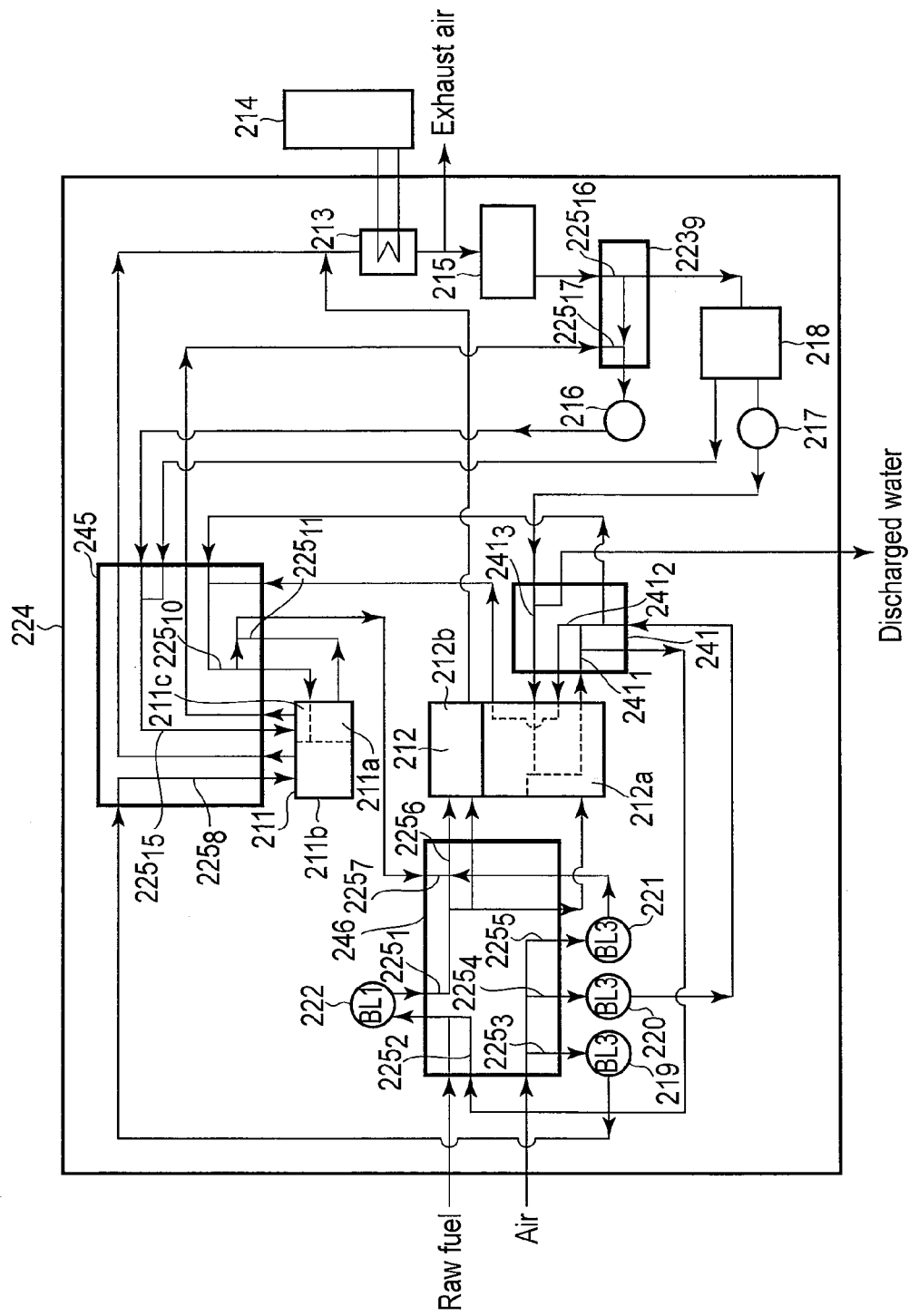
FIG. 18 is a block diagram of a fuel-cell power generation system according to an eighth embodiment.

A fuel-cell power generation system according to an eighth embodiment will be explained with reference to FIG. 18. The same members as those in FIGS. 10 to 17 are indicated by the same reference numbers and an explanation of them will be omitted.

The fuel-cell power generation system according to the eighth embodiment is characterized by comprising a thirteenth integrated pipe fitting 246 which has both of the functions of the second integrated pipe fitting and eleventh integrated pipe fitting instead of using the second and eleventh integrated pipe fittings in the fuel-cell power generation system of FIG. 16. The thirteenth integrated pipe fitting 245 has the functions of the first, second, and third integrated pipe fittings in the fuel-cell power generation system of FIG. 10.

Specifically, the thirteenth integrated pipe fitting 246 includes a first flow path $225_1$ which supplies raw fuel to be supplied to the reforming unit $212a$ and burner unit $212b$ in the reformer 212, a second flow path $225_2$ through which reformed gas discharged from the reformer 212 flows, a third flow path $225_3$ which supplies air to the cathode $211b$ of the fuel cell stack assembly 211, a fourth flow path $225_4$ which supplies air to the reformer 212, a fifth flow path $225_5$ which supplies raw fuel and air to the burner $212b$ of the reformer 212, a sixth flow path $225_6$ which supplies raw fuel and air to the burner unit $212b$, and a seventh flow path $225_7$ through which anode offgas discharged from the anode $211a$ of the fuel cell stack assembly 211 flows.

The eighth embodiment can further eliminate one integrated pipe fitting as compared with the seventh embodiment, enabling a space for piping to be reduced more.

Ninth Embodiment

Figure 19:
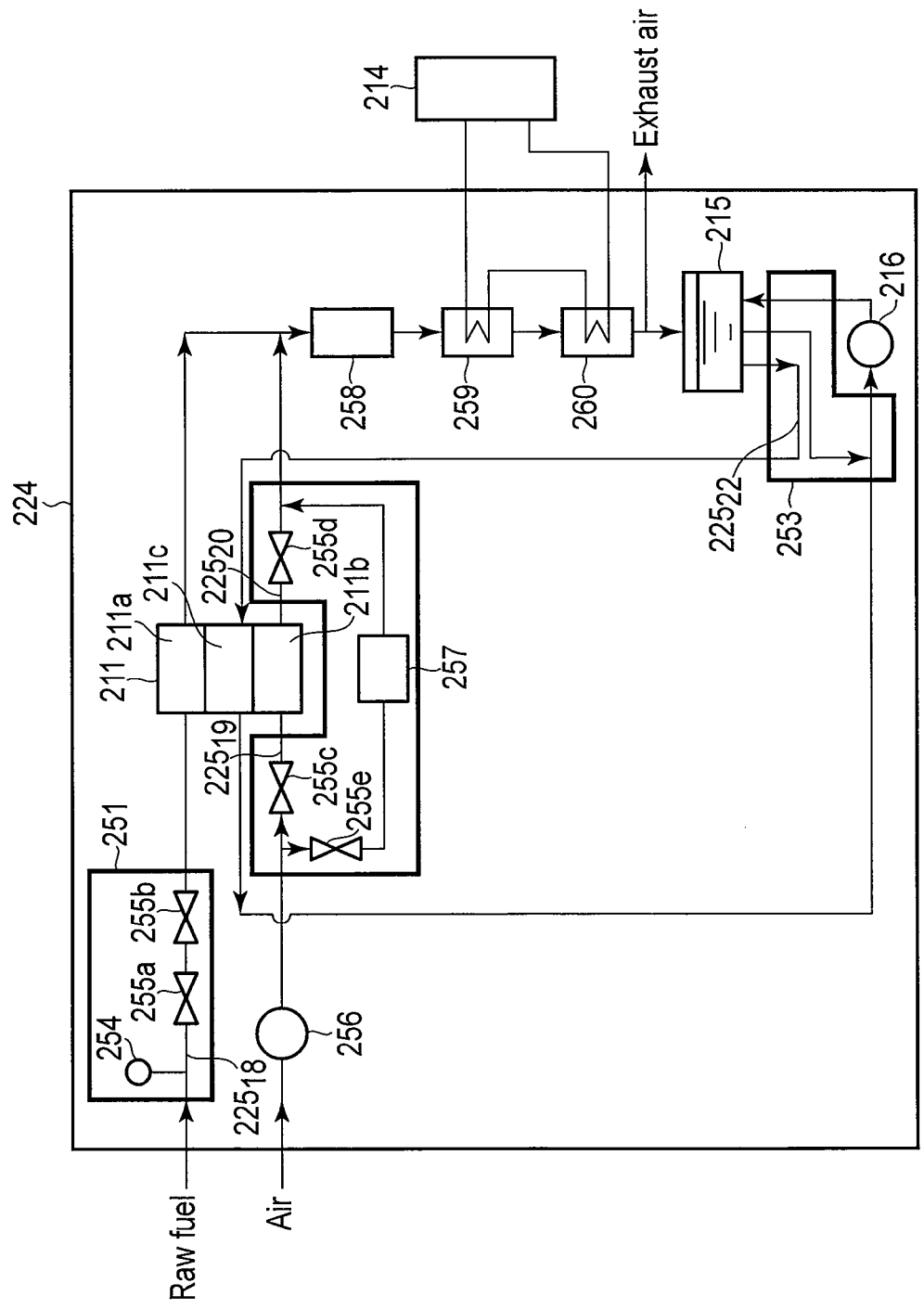
FIG. 19 is a block diagram of a fuel-cell power generation system according to a ninth embodiment.

A fuel-cell power generation system according to a ninth embodiment will be explained with reference to FIG. 19. The same members as those in FIG. 10 are indicated by the same reference numbers and an explanation of them will be omitted. The fuel-cell power generation system is of a type that uses, for example, pure hydrogen as raw fuel without using a reformer.

The fuel-cell power generation system of the ninth embodiment comprises a fourteenth to a sixteenth integrated pipe fitting 251, 252, 253. The fourteenth integrated pipe fitting 251 includes an eighteenth flow path $225_{18}$ which supplies raw fuel to the fuel cell stack assembly 211. In the eighteenth flow path $225_{18}$, a sensor 254 that monitors the pressure of raw fuel and cutoff valves $255a$, $255b$ that cut off the supply of raw fuel are inserted.

The fifteenth integrated pipe fitting 252 includes a nineteenth flow path $225_{19}$ which supplies air to the cathode $211b$ of the fuel cell stack assembly 211, a twentieth flow path $225_{20}$ through which air discharged from the cathode $221b$ flows, and a twenty-first flow path (bypass flow path) $225_{21}$ through which air bypassing the cathode $211b$ flows. Valves $255c$, $255d$ which cut off the flow of air at the start of the fuel cell stack assembly 211 are inserted in the nineteenth flow path $225_{19}$ in front of and in the twentieth flow path $225_{20}$ behind the cathode 211b, respectively. An air blower 256 supplies air to the nineteenth flow path $225_{19}$. In the twenty-first flow path $225_{21}$, a valve 255e that cuts off the flow of air at the time of power generation and a heater 257 for heating air that has bypassed the cathode 211b at the startup is inserted. The sixteenth integrated pipe fitting 253 includes not only a twenty-second flow path $225_{22}$ through which cooling water to the fuel cell stack assembly 211 flows but also flow paths through which cooling water to be supplied to the cooling water pump 216, cooling water discharged from the cooling water pump 216, and priming water for the cooling pump 216 flow.

Between the fifteenth and sixteenth integrated pipe fittings 252, 253, a catalytic combustor 258, heat exchangers 259, 260, and a cooling water tank 215 are provided. The catalytic combustor 258 burns unreacted gas discharged from the anode 211a and unreacted gas discharged from the cathode 211b. Exhaust air from the catalytic combustor 258 is subjected to heat exchange at the heat exchangers 259, 260. The resulting heat is accumulated in the hot-water cylinder 214 and used for hot-water supply and heating. Gas discharged from the heat exchanger 260 is discharged outside the fuel package 224 and condensed water is accumulated in the cooling water tank 215. At the inlet of the cooling water pump 216, a flow path into which priming water is introduced from the cooling water tank 251 at the start of the cooling water pump 216.

The ninth embodiment uses the fourteenth to sixteenth integrated pipe fittings 251, 252, 253, thereby enabling a space for piping to be reduced remarkably.

As described above, according to the third to ninth embodiments, a space for piping can be reduced remarkably.

In addition, various inventions can be extracted by combining suitably a plurality of component elements disclosed in the third to ninth embodiments. For example, as explained in the third embodiment, the effect of using an integrated pipe fitting becomes greater as the number of functions added to the integrated pipe fitting is larger. Therefore, although use of four integrated pipe fittings shown in the eighth embodiment is ideal, the number of integrated pipe fittings is selected, taking the shape of a device, maintainability, and the like into account. Furthermore, the types of fluid flowing in an integrated pipe fitting are not limited to what have been described in the embodiments and may be combined variously. For instance, it goes without saying that an integrated pipe fitting configuration may be applied to an exhaust heat recovery system or the like.

As described above in detail, according to each of the embodiments, it is possible to increase the manufacturability and realize size reduction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fuel-cell power generation system comprising:
    a fuel cell that generates electricity by electrochemical reaction using fuel and an oxidizer;
    a resin module that is provided outside the fuel cell, the resin module including portions on which a plurality of devices can be mounted, and the resin module being configured as a subassembly of a plurality of flow paths through which fuel, air, or water flows, inner walls defining the flow paths being made of resin, the plurality of flow paths being formed to correspond to the plurality of devices and being formed integrally within the resin module; and
    a cut-off device formed separate from the resin module and configured to directly connect to the resin module at the portions on which a plurality of devices can be mounted;
    wherein the resin module includes:
        a welded surface part, to which a weld lid is welded when vibration welding is performed, and
        a first wall and a second wall, which are respectively provided at a first side of the welded surface and at a second side of the welded surface while keeping certain distances and spaces from the welded surface,
        wherein when the resin module is covered with the welded part, a first trap part formed between the first wall and the welded surface part, and
        a second trap part formed between the second wall and the welded surface part and
        wherein when vibration welding is performed, swarf produced from the welded surface part is trapped and sealed by either of the first trap part or the second trap part.

2. The fuel-cell power generation system according to claim 1, wherein the resin module includes an inlet coupling part and an outlet coupling part provided at an inlet and an outlet of the flow path respectively, the inlet coupling part and the outlet coupling part having a quick-fastener structure.

3. The fuel-cell power generation system according to claim 1, wherein the inside of the resin module has a larger cross-sectional area than that of the flow path and further includes a buffer unit connected to the flow path.

4. The fuel-cell power generation system according to claim 1, wherein the resin module has a structure that causes a device to be installed via an O-ring.

5. The fuel-cell power generation system according to claim 1, wherein resin material for the resin module includes polyphenylene sulfide.

6. The fuel-cell power generation system according to claim 1, wherein
    the resin module is formed such that a plurality of flow paths are integrally molded with resin,
    the system further comprises a device fixed to the resin module via a sealing member,
    a through-hole is made in one of the resin module and the device and a small diameter hole smaller in diameter than that of the through-hole is made in the other, and
    a fixing screw is screwed into the through-hole and the small diameter hole, thereby fixing the module and device to each other, and
    a tapping screw requiring no insert member is used as the fixing screw, the angle of each thread of the screw being in a range of 20 to 35°.

7. The fuel-cell power generation system according to claim 6, wherein the resin module includes
    a first convex structure part that is located in a place where the sealing member is arranged,
    a plurality of second convex structure parts that are located in a plurality of places in which the fixing screw is screwed and fixed, and a rib that couples at least two of the first convex structure part and the second convex structure parts to each other.

8. The fuel-cell power generation system according to claim 6, wherein the material of the device in a position opposite the resin module is the same as that of the resin module.

9. The fuel-cell power generation system according to claim 6, wherein a plurality of sealing members are arranged on a surface on which the resin module and the device are installed and fluid passage holes are made in areas divided by the sealing members, respectively.

* * * * *